(12) United States Patent
Kikuchi

(10) Patent No.: US 8,747,509 B2
(45) Date of Patent: Jun. 10, 2014

(54) HONEYCOMB FILTER AND MANUFACTURING METHOD OF THE SAME

(75) Inventor: Yoshio Kikuchi, Nagoya (JP)

(73) Assignee: NGK Insulators, Ltd., Nagoya (JP)

(*) Notice: Subject to any disclaimer, the term of this patent is extended or adjusted under 35 U.S.C. 154(b) by 0 days.

(21) Appl. No.: 13/424,764

(22) Filed: Mar. 20, 2012

(65) Prior Publication Data

US 2012/0240539 A1    Sep. 27, 2012

(30) Foreign Application Priority Data

Mar. 24, 2011   (JP) .................. 2011-066125

(51) Int. Cl.
| | | |
|---|---|---|
| *B01D 39/06* | (2006.01) | |
| *B01D 39/14* | (2006.01) | |
| *B01D 50/00* | (2006.01) | |
| *B01D 24/00* | (2006.01) | |

(52) U.S. Cl.
USPC ............ 55/523; 55/522; 55/524; 422/169; 422/170; 422/171; 422/172; 422/177; 422/178; 422/179; 422/180; 422/181; 422/182

(58) Field of Classification Search
USPC ............ 55/522–524; 422/169–172, 177–182
See application file for complete search history.

(56) References Cited

U.S. PATENT DOCUMENTS

| | | |
|---|---|---|
| 4,719,058 A | 1/1988 | Komoda |
| 6,479,099 B1 | 11/2002 | Takahashi et al. |
| 6,509,060 B1 | 1/2003 | Komoda et al. |
| 2004/0191133 A1* | 9/2004 | Yamaguchi .............. 422/180 |
| 2010/0126133 A1* | 5/2010 | Fekety et al. ............. 55/523 |
| 2010/0135866 A1 | 6/2010 | Mizuno et al. |

FOREIGN PATENT DOCUMENTS

| | | |
|---|---|---|
| EP | 1 607 131 A1 | 12/2005 |
| EP | 2 168 662 A1 | 3/2010 |
| EP | 2 174 701 A1 | 4/2010 |
| JP | 63-066566 B2 | 12/1988 |
| JP | 01-274815 A1 | 11/1989 |
| JP | 07-124428 A1 | 5/1995 |
| JP | 2000-288324 A1 | 10/2000 |
| JP | 2010-095399 A1 | 4/2010 |
| JP | 2010-227743 A1 | 10/2010 |
| WO | 2008/136232 A1 | 11/2008 |

OTHER PUBLICATIONS

Extended European Search Report dated Aug. 22, 2012.

(Continued)

*Primary Examiner* — Amber Orlando
(74) *Attorney, Agent, or Firm* — Burr & Brown, PLLC

(57) ABSTRACT

There is provided a honeycomb filter including a honeycomb base material including a porous partition wall parent material; plugged portions arranged in open frontal areas of predetermined cells in an end surface on an inflow side of the fluid, and open frontal areas of the remaining cells in an end surface on an outflow side of the fluid; and a porous collecting layer disposed on the surface of the partition wall parent material in the remaining cells. In a cross section orthogonal to an extending direction of the cells, a shape of the cells is a rectangular shape, and a thickness of a portion of the collecting layer which is positioned in each of corner portions of each of the cells is from one to three times that of a portion of the collecting layer which is positioned in the center of each of sides of the cell.

8 Claims, 12 Drawing Sheets

(56) References Cited

OTHER PUBLICATIONS

Yukio Mizuno et al., "*Study on Wall Pore Structure for Next Generation Diesel Particulate Filter*," SAE Technical Paper 2008-01-0618, Society of Automotive Engineers, 2008, pp. 289-298.

E. Ohara et al., "*Filtration Behavior of Diesel Particulate Filters (1),*" SAE Technical Paper 2007-01-0921, Society of Automotive Engineers, 2007, pp. 261-272.

U.S. Appl. No. 13/416,299, filed Mar. 9, 2012, Isoda et al.
U.S. Appl. No. 13/420,774, filed Mar. 15, 2012, Isoda et al.
U.S. Appl. No. 13/424,722, filed Mar. 20, 2012, Kikuchi et al.

\* cited by examiner

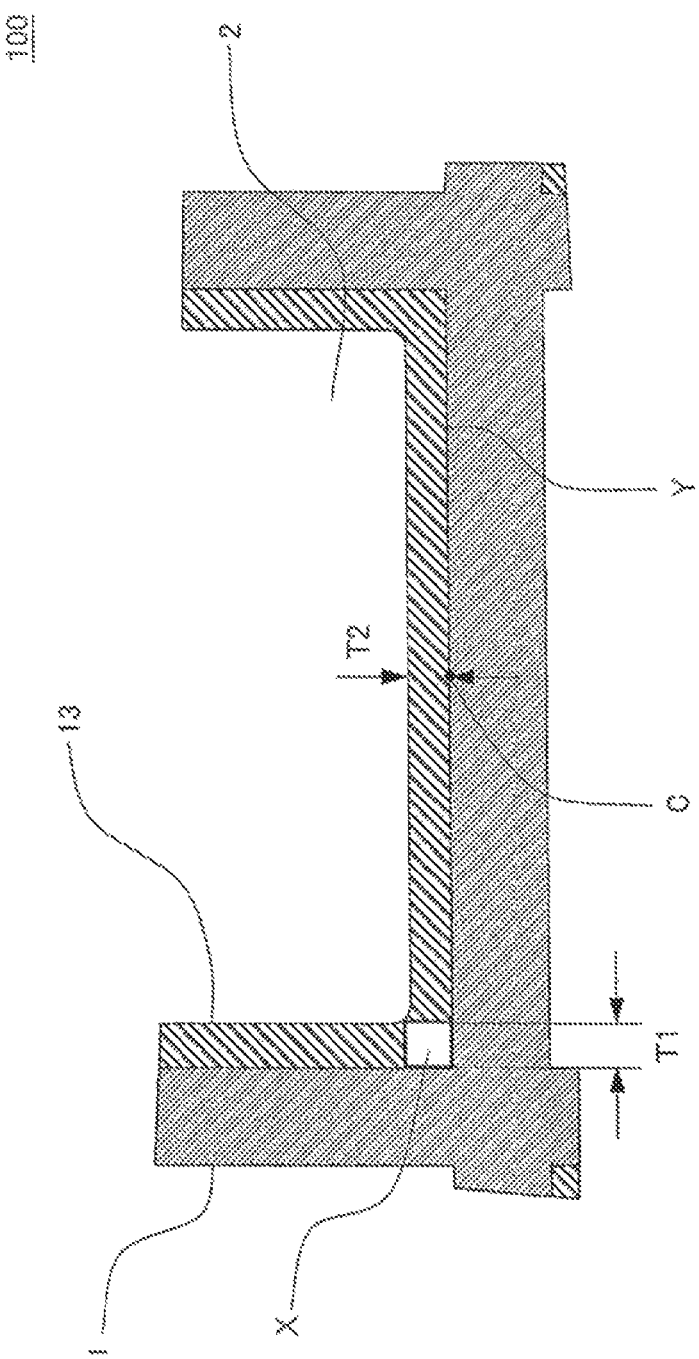

HONEYCOMB FILTER AND MANUFACTURING METHOD OF THE SAME

BACKGROUND OF THE INVENTION

1. Field of the Invention

The present invention relates to a honeycomb filter and a manufacturing method of the honeycomb filter. More particularly, it relates to a honeycomb filter which can suppress the increase of an initial pressure loss and has a high initial collecting efficiency of a particulate matter, and a manufacturing method of a honeycomb filter which can manufacture such a honeycomb filter.

2. Description of Related Art

In gases discharged from internal combustion engines such as diesel engines, various types of combustion apparatuses and the like, a large amount of particulate matter (PM) mainly composed of soot is included. When this PM is discharged as it is to the atmosphere, environmental pollutions are caused. Therefore, a diesel particulate filter (DPF) for collecting the PM is mounted on an exhaust system of an exhaust gas.

As such a DPF, there has been used, for example, a honeycomb filter "including porous partition walls to partition and form a plurality of cells which become through channels of a fluid (an exhaust gas and a purified gas) and an outer peripheral wall positioned in an outermost periphery, and further including plugged portions in open frontal areas of predetermined cells in an end surface on an inflow side of the fluid (the exhaust gas) and open frontal areas of the remaining cells in an end surface on an outflow side of the fluid (the purified gas)".

There has been a problem that when the PM in the exhaust gas is collected by using such a honeycomb filter, the PM penetrates into the porous partition walls to clog pores of the partition walls, and a pressure loss rapidly increases sometimes.

A filter has been suggested in which to suppress the increase of the pressure loss, a collecting layer for collecting a PM is disposed on the surfaces of partition walls, and the collecting layer prevents the penetration of the PM into the partition walls (e.g., see Non-Patent Document 1).

Heretofore, as a regulation on an automobile exhaust gas, the regulation by means of a mass of the PM has been performed. In recent years, however, the introduction of the regulation on the number of the PMs has been investigated. In this case, it is necessary to securely collect the PM having small particle diameters. It is known that the PM having the small particle diameters is collected by the surfaces of pores which are present in a filter, mainly by diffusion (e.g., see Non-Patent Document 2).

Heretofore, when the honeycomb filter including the collecting layer is prepared, the collecting layer has been formed by immersing the honeycomb filter into a collecting layer forming slurry (a collecting layer forming raw material) or pouring the collecting layer forming slurry into cells of the honeycomb filter, to coat porous partition walls (a partition wall parent material) with the collecting layer forming slurry, followed by firing. Moreover, when a porous film having smaller pore diameters and smaller thickness than the porous partition walls is formed on the surfaces of the partition walls, it has been necessary to set the particle diameters of ceramic particles constituting the porous film to be smaller than the pore diameters of the partition walls. However, in this method, there has been a problem that the collecting layer forming slurry penetrates into the pores of the partition walls (the partition wall parent material) of the honeycomb filter, and an initial pressure loss in the case of the circulation of the exhaust gas through the obtained honeycomb filter becomes high.

Furthermore, in the case of a honeycomb filter made of cordierite, aluminum titanate or the like, there has been a problem that a slurry penetrates into micro cracks formed in the honeycomb filter or the like, and a thermal expansion coefficient or the like of the obtained honeycomb filter or the like becomes high.

On the other hand, a method has been suggested in which pores of a porous support material are charged with "a substance which can be removed later", the pores are clogged, and then the surface of the porous support material is coated with a slurry including ceramic particles having small particle diameters (e.g., see Patent Documents 1 to 3). Examples of "the substance which can be removed later" can include combustible substances (Patent Document 1). When the combustible substances are used, the combustible substances can be burnt and removed later in a firing step. Moreover, examples of "the substance which can be removed later" can include water and alcohol (Patent Documents 2 and 3). When the water or alcohol is used, the surface is coated with the slurry and then dried, whereby the water or alcohol can be removed.

Moreover, a method has been suggested in which a ceramic porous film (a collecting layer) is formed on the surface of a porous support material by use of fine particles mainly composed of an oxide such as alumina or zirconia (e.g., see Patent Document 4). Specifically in the method, the ceramic porous film is formed on the surface of the porous support material made of a porous ceramic by use of a porous film forming coating material containing "the fine particles mainly composed of the oxide" having controlled "average primary particle diameter, tap bulk density and average secondary particle diameter in the coating material (the average secondary particle diameter when the material is dispersed in a dispersion medium)", and containing the dispersion medium mainly composed of water. A viscosity of the material is controlled to be 2 mPa·s or larger and 1000 mPa·s or smaller.

Furthermore, a method has been suggested in which a collecting layer forming slurry prepared by further adding a pore former and water to the same material as that of a honeycomb formed body is sprayed on the honeycomb formed body, to deposit the collecting layer forming slurry on partition walls of the honeycomb formed body, followed by drying and firing, thereby disposing the collecting layer on the honeycomb formed body (e.g., see Patent Document 5).

In addition, a method has been suggested in which a slurry made of a bonding material mainly composed of an inorganic fibrous material longer than pore diameters of porous partition walls and silica or alumina is deposited on the surfaces of the partition walls, followed by drying and firing, thereby forming a porous film (a collecting layer) on surface layers of the partition walls (e.g., see Patent Document 5).

On the other hand, when the porous partition walls (the partition wall parent material) are coated with the collecting layer forming slurry by immersing a honeycomb filter in the collecting layer forming slurry (the collecting layer forming raw material) or pouring the collecting layer forming slurry into cells of the honeycomb filter, there has been a problem that a large amount of collecting layer forming slurry is deposited on corner portions of the cells (the corner portions of the cells in a cross section of the filter which is orthogonal to a cell extending direction). A film thickness of the obtained collecting layer becomes non-uniform.

Such a problem also occurs, when a filtering film is formed on the surfaces of cell walls of a support material during the manufacturing of a monolith type ceramic filter for use in microfiltration or ultrafiltration. On the other hand, a method has been suggested in which corner portions of cells are chamfered or formed in a circular shape, to make a thickness of a filtering film uniform (e.g., see Patent Document 6). However, the monolith type ceramic filter (the filter for liquid filtering) for use in the microfiltration or the ultrafiltration is completely different in technical field from a honeycomb filter (the filter for gas filtering) to collect a particulate matter in an exhaust gas. Therefore, a technology of the monolith type ceramic filter for use in the microfiltration or the ultrafiltration cannot immediately be applied to the honeycomb filter to collect the particulate matter in the exhaust gas.

[Patent Document 1] JP-A-1-274815
[Patent Document 2] JP-B-63-66566
[Patent Document 3] JP-A-2000-288324
[Patent Document 4] JP-A-2010-95399
[Patent Document 5] WO2008/136232A1
[Patent Document 6] JP-A-7-124428
[Non-Patent Document 1] SAE Technical Paper 2008-01-0618, Society of Automotive Engineers (2008)
[Non-Patent Document 2] SAE Technical Paper 2007-01-0921, Society of Automotive Engineers (2007)

SUMMARY OF THE INVENTION

In the manufacturing methods disclosed in Patent Documents 1 to 4, the collecting layer forming slurry does not easily penetrate into pores of a porous support material (partition walls), but it has been difficult to securely suppress an amount of the penetration.

An inorganic fiber material used in the manufacturing method disclosed in Patent Document 5 is an object substance of laws and regulations depending upon the district, and it has been desired that the material is not usually used.

In the manufacturing method disclosed in Patent Document 5, a material of partition walls (a partition wall parent material) of a honeycomb filter is the same as that of a collecting layer. Therefore, at the time of firing, the partition wall parent material and the collecting layer are sintered at the same temperature, and pores of the collecting layer become small sometimes. Moreover, when a slurry is sprayed and deposited on the partition wall parent material, it tends to be difficult to form the collecting layer having a uniform thickness, as compared with a case where the partition wall parent material is dip-coated with the slurry.

Moreover, if the technology of the monolith type ceramic filter disclosed in Patent Document 6 is applied to a honeycomb filter which collects a particulate matter in an exhaust gas, corner portions of cells are formed in a circular shape or the like. Therefore, a sectional area of the cells (the area of the cells in a cross section of the filter which is orthogonal to a cell extending direction) becomes relatively small. A problem occurs that a pressure loss increases.

The present invention has been developed in view of the above problems, and an object thereof is to provide a honeycomb filter which can decrease a pressure loss and can enhance a collecting efficiency, and a manufacturing method of a honeycomb filter which can manufacture such a honeycomb filter.

To solve the above problems, according to the present invention, there are provided the following honeycomb filter and a manufacturing method of the honeycomb filter.

[1] A honeycomb filter comprising: a honeycomb base material including a porous partition wall parent material to partition and form a plurality of cells which become through channels of a fluid and which extend from one end surface to the other end surface; plugged portions arranged in open frontal areas of predetermined cells in an end surface on an inflow side of the fluid which is the one end surface, and open frontal areas of the remaining cells in an end surface on an outflow side of the fluid which is the other end surface; and a porous collecting layer disposed on the surface of the partition wall parent material in the remaining cells, wherein in a cross section orthogonal to an extending direction of the cells, a shape of the cells is a rectangular shape, and a thickness of a portion of the collecting layer which is positioned in each of corner portions of each of the cells is from one to three times that of a portion of the collecting layer which is positioned in the center of each of sides of the cell.

[2] The honeycomb filter according to [1], wherein in the cross section orthogonal to the extending direction of the cells, the portion of the collecting layer which is positioned in the center of the side of the cell is from 10 to 30 μm.

[3] The honeycomb filter according to [1] or [2], wherein in the cross section orthogonal to the extending direction of the cells, an area of the cells is from 0.8 to 3.0 mm².

[4] The honeycomb filter according to any one of [1] to [3], wherein a material of the partition wall parent material is cordierite, and a material of the collecting layer includes at least one selected from the group consisting of alumina, mullite and spinel.

[5] A manufacturing method of a honeycomb filter, comprising: a forming step of forming a ceramic forming raw material containing a ceramic raw material, and forming a honeycomb formed body including a non-fired partition wall parent material to partition and form a plurality of cells which become through channels of a fluid and extend from one end surface to the other end surface; a first plugging step of arranging plugged portions in open frontal areas of the predetermined cells in an end surface of the honeycomb formed body on an inflow side of the fluid which is the one end surface; an aqueous electrolyte solution coating step of attaching an aqueous electrolyte solution having a concentration of 50 to 100% of a saturated solubility to the surface of the non-fired partition wall parent material in the remaining cells of the honeycomb formed body which are not provided with the plugged portions; an electrolyte film forming step of drying the aqueous electrolyte solution, to form an electrolyte film on the surface of the non-fired partition wall parent material in the cells; a collecting layer forming raw material coating step of attaching "a collecting layer forming raw material containing a ceramic raw material for a collecting layer which has a higher melting point than the ceramic raw material, and an aqueous electrolyte solution having a concentration of 50 to 100% of a saturated solubility" to the surface of the electrolyte film formed on the surface of the non-fired partition wall parent material; a second plugging step of arranging plugged portions in open frontal areas of the remaining cells in an end surface of the honeycomb formed body on an outflow side of the fluid which is the other end surface; and a firing step of firing the honeycomb formed body coated with the electrolyte film and the collecting layer forming raw material to prepare the honeycomb filter.

[6] The manufacturing method of the honeycomb filter according to [5], wherein the aqueous electrolyte solution contains, as the electrolyte, at least one anion selected from the group consisting of a citrate ion, a tartrate ion, an acetate ion and a chloride ion, and at least one cation selected from the group consisting of an alkali earth metal ion, a hydrogen ion and an ammonium ion.

According to a honeycomb filter of the present invention, in a cross section thereof orthogonal to a cell extending direction, a thickness of "a portion positioned in each of corner portions of each of cells" of a collecting layer is from one to three times that of "a portion positioned in the center of each of sides of the cell" of the collecting layer. Therefore, a gas permeates the whole collecting layer (the gas is prevented from permeating only part of the collecting layer). It is possible to lower a pressure loss and enhance a collecting efficiency.

According to a manufacturing method of a honeycomb filter of the present invention, "an aqueous electrolyte solution having a concentration of 50 to 100% of a saturated solubility" is attached to the surface of a non-fired partition wall parent material in the remaining cells of a honeycomb formed body. The aqueous electrolyte solution is dried, to form an electrolyte film on the surface of the non-fired partition wall parent material in the cells. A collecting layer forming raw material containing "a ceramic raw material for a collecting layer which has a higher melting point than a ceramic raw material, and an aqueous electrolyte solution having a concentration of 50 to 100% of a saturated solubility" is attached to the surface of the electrolyte film, and then fired. Consequently, there is obtained a state where the electrolyte film disappears during the firing, and the collecting layer directly comes in contact with the partition wall parent material. In consequence, it is possible to obtain a honeycomb filter (the honeycomb filter including the collecting layer on the surface of the partition wall parent material) in which a thickness of "a portion positioned in each of corner portions of each of cells" of the collecting layer is from one to three times that of "a portion positioned in the center of each of sides of the cell" of the collecting layer.

BRIEF DESCRIPTION OF THE DRAWINGS

FIG. 3B is a schematic view showing part of the cross section of the embodiment of the honeycomb filter of the present invention which is orthogonal to the cell extending direction;

DETAILED DESCRIPTION OF THE INVENTION

Hereinafter, embodiments of the present invention will specifically be described with reference to the drawings, but it should be understood that the present invention is not limited to the following embodiments and that the following embodiments to which changes, improvements and the like are suitably added on the basis of ordinary knowledge of a person skilled in the art without departing from the scope of the present invention also fall in the scope of the present invention.

Figure 1:
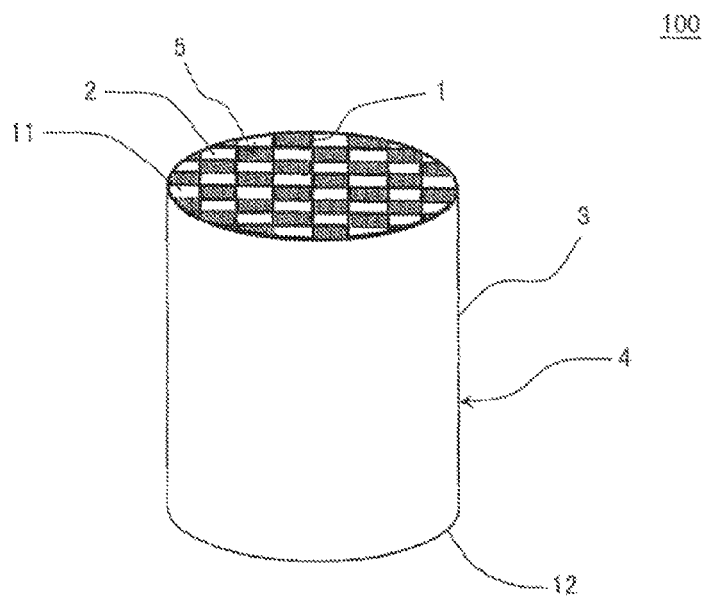
FIG. 1 is a perspective view schematically showing an embodiment of a honeycomb filter of the present invention.
Figure 2:
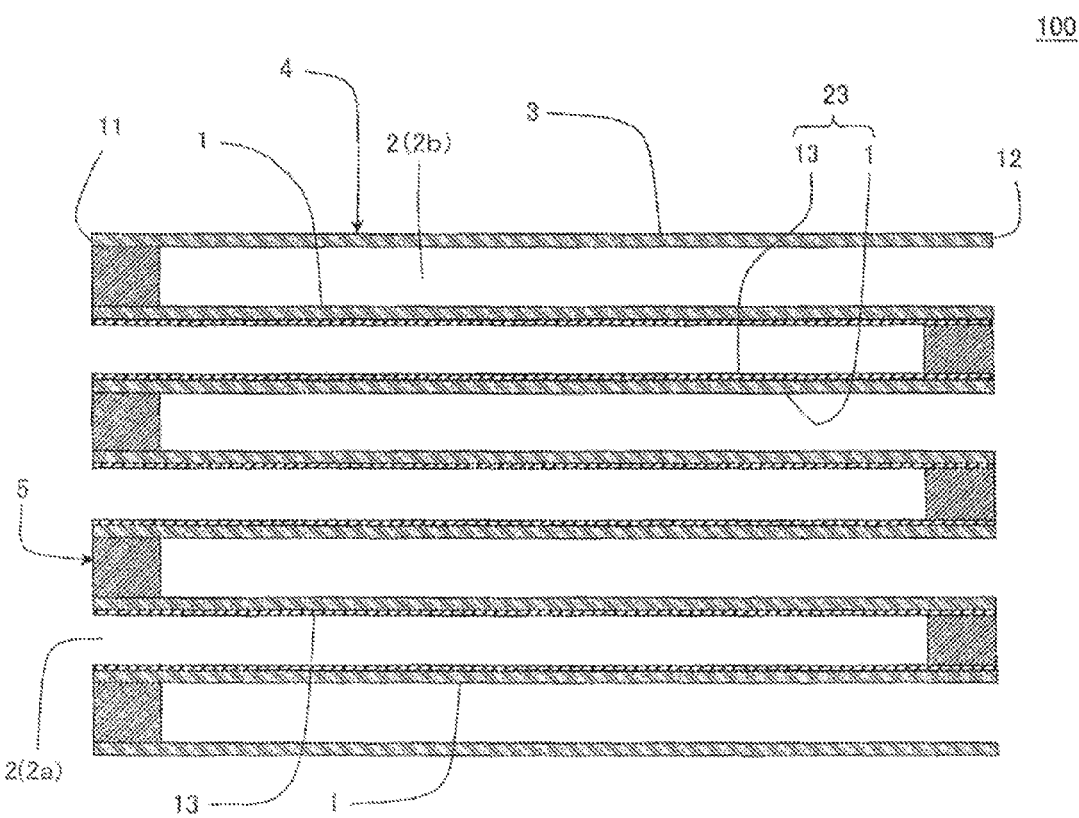
FIG. 2 is a schematic view showing a cross section of the embodiment of the honeycomb filter of the present invention which is parallel to a cell extending direction.
Figure 3A:
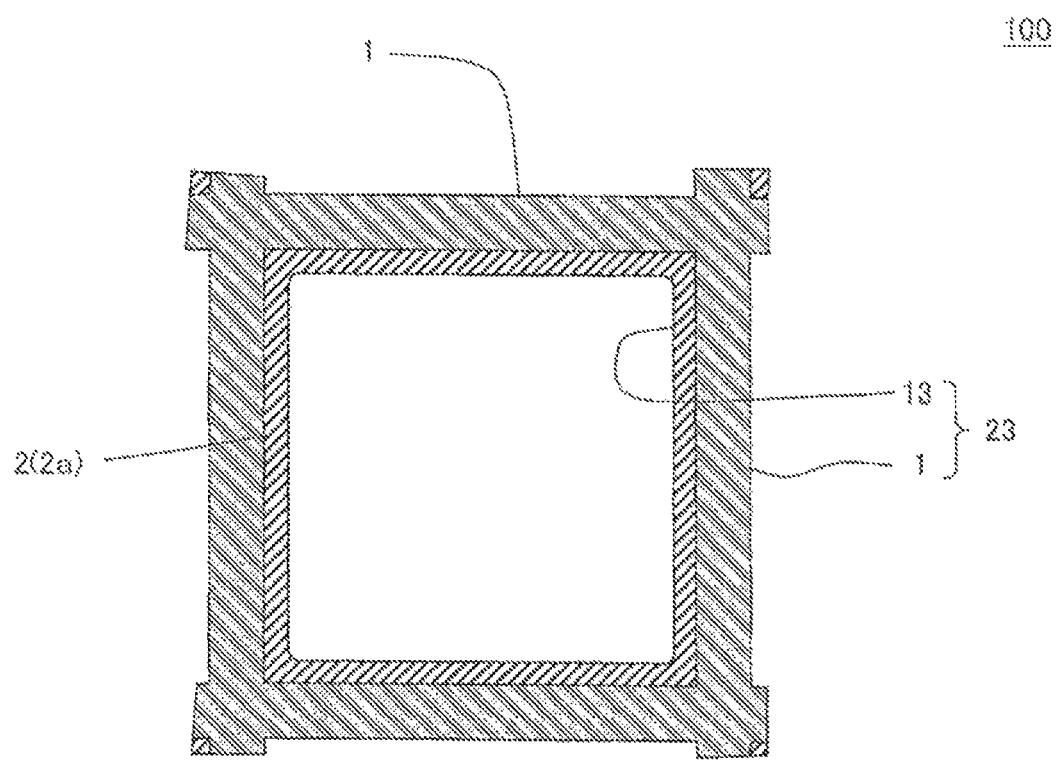
FIG. 3A is a schematic view showing part of a cross section of the embodiment of the honeycomb filter of the present invention which is orthogonal to the cell extending direction.

(1) Honeycomb Filter:

As shown in FIG. 1 to FIG. 3A, an embodiment (a honeycomb filter 100) of a honeycomb filter of the present invention includes a honeycomb base material 4 having a porous partition wall parent material 1 to partition and form a plurality of cells 2 which become through channels of a fluid and extend from one end surface to the other end surface; plugged portions 5 arranged in open frontal areas of predetermined cells 2 (outflow cells 2b) in an end surface 11 on an inflow side of the fluid which is the one end surface and open frontal areas of the remaining cells 2 (inflow cells 2a) in an end surface 12 on an outflow side of the fluid which is the other end surface; and a porous collecting layer 13 disposed on the surface of the partition wall parent material 1 in the remaining cells. In a cross section of the honeycomb filter which is orthogonal to a cell extending direction, a shape of the cells 2 is a rectangular shape. "A thickness of a portion positioned in a corner portion of each of the cells 2" of the collecting layer 13 is from one to three times that of "a portion positioned in the center of a side of the cell 2" of the collecting layer 13. It is to be noted that the collecting layer 13 may be disposed on the surface of the partition wall parent material 1 in the outflow cells 2b. Moreover, "the end surface" of the honeycomb base material means a surface in which the cells are open. Moreover, the partition wall parent material 1 provided with the collecting layer 13 form partition walls 23. That is, a combination of the partition wall parent material 1 and the collecting layer 13 forms the partition walls 23. FIG. 1 is a perspective view schematically showing the embodiment of the honeycomb filter of the present invention. FIG. 2 is a schematic view showing a cross section parallel to a cell extending direction in the embodiment of the honeycomb filter of the present invention. FIG. 3A is a schematic view showing part of a cross section of the embodiment of the honeycomb filter of the present invention which is orthogonal to the cell extending direction;

In the cross section of the honeycomb filter 100 of the present embodiment which is orthogonal to the cell extending direction, "the shape of the cells 2 is the rectangular shape, and "the thickness of the portion positioned in the corner portion of each of the cells" of the collecting layer is from one to three times "the thickness of the portion positioned in the center of the side of the cell" of the collecting layer". Therefore, it can be considered that the thickness of the collecting layer is substantially uniform, and a gas permeates the whole collecting layer (the gas is prevented from permeating only part of the collecting layer). It is possible to lower a pressure loss and enhance a collecting efficiency. Here, "the thickness of the portion positioned in the corner portion of each cell" of the collecting layer is, as shown in FIG. 3B, a length T1 of one side of "a square X" positioned in the corner portion of the cell 2 "with sides (the respective sides of the square X) parallel to sides of the cell 2" and inscribed in the collecting layer 13. "The thickness of the portion positioned in the corner portion of the cell" of the collecting layer is usually the thickness of the thickest portion of the collecting layer 13. Moreover, "the thickness of the portion positioned in the center of the side of the cell" of the collecting layer is, as shown in FIG. 3B, a thickness T2 of the collecting layer 13 in a center C of a side Y of the cell 2. "The thickness of the portion positioned in the center of the side of the cell" of the collecting layer is usually the thickness of the thinnest portion of the collecting layer 13. FIG. 3B is a schematic view showing part of the cross section of the embodiment of the honeycomb filter of the present invention which is orthogonal to the cell extending direction;

In the cross section of the honeycomb filter 100 of the present embodiment which is orthogonal to the cell extending direction, "the thickness (a film thickness) of the portion positioned in the corner portion of the cell" of the collecting layer 13 is from one to three times "the thickness (the film thickness) of the portion positioned in the center of the side of the cell" of the collecting layer 13, preferably from 1.4 to 2.3 times, further preferably from 1.4 to 2.0 times, and especially preferably from 1.4 to 1.6 times. It is to be noted that from the viewpoints of the pressure loss and the collecting efficiency, "the thickness (the film thickness) of the portion positioned in the corner portion of the cell" of the collecting layer is preferably closer to "one time" of "the thickness (the film thickness) of the portion positioned in the center of the side of the cell" of the collecting layer 13. In the actual manufacturing, however, about 1.4 time becomes a lower limit value. When "the thickness (the film thickness) of the portion positioned in the corner portion of the cell" of the collecting layer 13 is larger than three times "the thickness (the film thickness) of the portion positioned in the center of the side of the cell" of the collecting layer 13, it can be considered that the thickness of the collecting layer is non-uniform. The gas unfavorably flows through thin portions of the collecting layer in a concentrated manner. That is, when the gas flows through the thin portions of the collecting layer in the concentrated manner, a flow speed of the gas in the thin portions locally becomes high. In consequence, the pressure loss unfavorably becomes large. Furthermore, when the flow speed of the gas locally becomes high, a collecting percentage by diffusion lowers, and the collecting efficiency unfavorably lowers. The thickness of the collecting layer is a value of the cross section orthogonal to the cell extending direction which is measured by using a scanning type electron microscope (SEM) image.

In the cross section of the honeycomb filter 100 of the present embodiment which is orthogonal to the cell extending direction, the shape of the cells 2 is rectangular, and preferably square. It is to be noted that four corners of the rectangular cell may be provided with a vertex, or may be formed in a curved shape. When the corner portion is formed in the curved shape, a curvature radius is preferably 0.1 mm or smaller. Here, the corner portion having a curvature radius of 0 mm is the vertex.

In the cross section of the honeycomb filter 100 of the present embodiment which is orthogonal to the cell extending direction, "the thickness (the film thickness) of the portion positioned in the center of the side of the cell" of the collecting layer 13 is preferably from 10 to 30 µm, further preferably from 15 to 30 µm, and especially preferably from 20 to 30 µm. When the thickness is smaller than 10 µm, the collecting efficiency lowers sometimes. When the thickness is larger than 30 µm, the collecting efficiency hardly enhances, and the pressure loss increases sometimes.

In the cross section of the honeycomb filter which is orthogonal to the cell extending direction, an area of each cell (a cell sectional area) is preferably from 0.8 to 3.0 $mm^2$, further preferably from 1.2 to 2.2 $mm^2$, and especially preferably from 1.3 to 1.5 $mm^2$. When the cell sectional area is smaller than 0.8 $mm^2$, the cells are clogged with a particulate matter in an exhaust gas sometimes, and the pressure loss becomes large sometimes. Moreover, when the cell sectional area is larger than 3.0 $mm^2$, an area of partition walls which collects the particulate matter becomes small. When the PM is collected, the pressure loss becomes large sometimes.

In the honeycomb filter 100 of the present embodiment, a melting point of a material constituting the collecting layer 13 is preferably higher than that of a material constituting the partition wall parent material 1, and the melting point of the material constituting the collecting layer 13 is further preferably 300 to 700° C. higher than that of the material constituting the partition wall parent material 1. Since the melting point of the material constituting the collecting layer 13 is higher than that of the material constituting the partition wall parent material 1, the raw material of the collecting layer can be prevented from being melted, when the partition wall parent material and the collecting layer are formed by performing firing in a process of manufacturing the honeycomb filter. It is possible to prevent a pore surface area per unit volume of the collecting layer from becoming small.

In the honeycomb filter 100 of the present embodiment, the pore surface area per unit volume of the collecting layer 13 is preferably 2.0 or more times, further preferably from 9 to 50 times, and especially preferably from 30 to 50 times a pore surface area per unit volume of the partition wall parent material 1. When the pore surface area per unit volume of the collecting layer 13 is 2.0 or more times that per unit volume of the partition wall parent material 1, it is possible to raise a PM initial collecting efficiency. Here, "the pore surface area" means an area of a wall surface in each pore (the surface of the partition wall exposed in the pore). Moreover, "the pore surface area per unit volume" means a total value of "the pore surface areas" of all the pores present in the unit volume. A method of measuring "the pore surface area per unit volume" is as follows. The honeycomb filter 100 is buried in a resin (an epoxy resin) to fill pores of the partition walls of the honeycomb filter 100 with the resin, thereby acquiring the scanning type electron microscope (SEM) image of a cross section of the honeycomb filter which is orthogonal to the cell extending direction. A partition wall in the obtained SEM image is divided by a width of 5 µm from a partition wall center (the center in a thickness direction) to a surface layer in the image (by image analysis), and each "divided part (divided region)" is subjected to the following processing ("the dividing" does not mean cutting, but means that each divided region is "distinguished" by a boundary line). A peripheral length of the surface of each partition wall and an area of each partition wall of each divided part are measured by using image analysis software (Image-Pro Plus 6.2J manufactured by Media Cybernetics Co.). "The peripheral length/the area" is the pore surface area per unit volume of the divided part. Here, "the peripheral length" is a length obtained by distinguishing a portion where the material is present and a portion (the pore) where the material is not present in each "divided part", and adding up all the lengths of the boundary lines between the portions where the material is present and the pores. The pore surface area per unit volume of the divided part closest to the surface is the pore surface area per unit volume of the collecting layer 13, and the pore surface area per unit volume of the divided part of the partition wall center is the pore surface area per unit volume of the partition wall parent material 1.

In the honeycomb filter 100 of the present embodiment, a thickness of a portion (a deep layer 22 (see FIG. 4)) of the collecting layer 13 which penetrates into pores of the partition wall parent material 1 is 6% or smaller, preferably 3% or smaller, and further preferably 1% or smaller of the thickness of each of the partition walls 23. Thus, since the thickness of the deep layer 22 (see FIG. 4) is 6% or smaller of that of the partition wall 23, it is possible to suppress the increase of an initial pressure loss. The thickness of the deep layer 22 (see FIG. 4) is preferably smaller, but about 0.1% is a lower limit value. The thickness of the partition wall 23 is a value measured by the scanning type electron microscope (SEM) image of the partition wall cross section.

Figure 4:
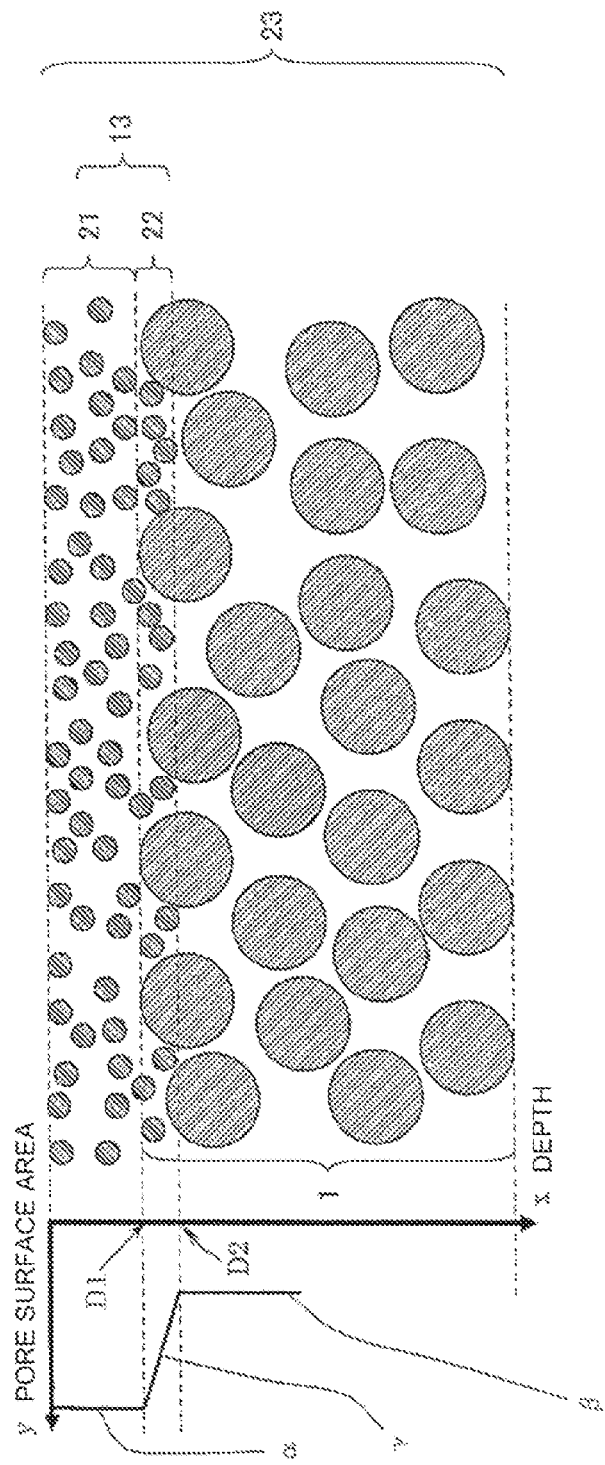
FIG. 4 is an enlarged schematic view showing a cross section of a partition wall in the embodiment of the honeycomb filter of the present invention.

In the honeycomb filter 100 of the present embodiment, as shown in FIG. 4, the partition wall 23 is constituted of the partition wall parent material 1 and the collecting layer 13. Moreover, the collecting layer 13 is constituted of a surface layer 21 positioned on an outer side from the surface of the partition wall parent material 1, and the deep layer 22 positioned on an inner side (inside the pores) from the surface of the partition wall parent material 1. FIG. 4 is an enlarged schematic view showing a cross section of the partition wall 23 in the embodiment of the honeycomb filter of the present invention. Moreover, in FIG. 4, a graph shown beside the partition wall 23 (on the left side of a sheet surface) is a graph (a depth-pore surface area graph) in which a y-axis indicates "the pore surface area" and an x-axis indicates "a depth from the surface of the partition wall (the surface of the collecting layer which is exposed on a cell side)". "The depth-pore surface area graph" shown in FIG. 4 indicates that the pore surface area of the surface layer 21 of the collecting layer 13 is largest, the pore surface area of a region where the only partition wall parent material 1 is present is smallest, and the pore surface area gradually becomes small from a position where a portion in which the deep layer 22 of the collecting layer 13 is present (the portion in which the deep layer 22 and the partition wall parent material 1 are mixed) comes in contact with the surface layer 21 to a region (the position) where the only partition wall parent material 1 is present. It is to be noted that "the pore surface area" shown in FIG. 4 is the pore surface area per unit volume.

A method of specifying "a boundary portion between the surface layer 21 of the collecting layer 13 and the deep layer 22 of the collecting layer 13" and "a boundary portion between the region where the deep layer 22 of the collecting layer 13 and the partition wall parent material 1 are mixed and the region where the only partition wall parent material 1 is present" in the partition wall 23 is as follows. A part between the center of the partition wall (the center in the thickness direction) and the surface of the collecting layer is divided by a width of 5 µm, and the pore surface area per unit volume of each "divided part (divided region)" is measured. "The dividing" of the partition wall is preferably performed by the image analysis ("the dividing" does not mean the cutting, but means that each divided region is "distinguished" by the boundary line). In this case, the pore surface area is preferably obtained by the scanning type electron microscope (SEM) image. The pore surface area of the divided part of the surface layer 21 (the region where the partition wall parent material 1 is not present) of the collecting layer 13 which is closest to the surface is the pore surface area of the surface layer 21. The pore surface area of the divided part closest to the center of the partition wall is the pore surface area of the region where the only partition wall parent material 1 is present (the pore surface area of the partition wall parent material 1). Moreover, in the "depth-pore surface area" coordinate shown in FIG. 4, a straight line α indicating that a value of a "pore surface area" axis (the y-axis) is a value of "the pore surface area of the surface layer 21" and a straight line β indicating that the value of the "pore surface area" axis (the y-axis) is a value of "the pore surface area of the region where the only partition wall parent material 1 is present" are drawn in parallel with a "depth" axis (the x-axis), respectively. Furthermore, "measured values of the pore surface areas" of the plurality of "divided parts" in the region where the deep layer 22 and the partition wall parent material 1 are mixed are linearly approximated (a minimum square process), to draw a straight line γ in a "depth-pore surface area" coordinate system. Then, "a value of a depth axis (the x-axis)" of an intersection between the line α indicating the above "pore surface area of the surface layer 21" and the line γ indicating "the pore surface area of a portion where the deep layer 22 and the partition wall parent material 1 are mixed" is a depth D1 of "a boundary portion between the surface layer 21 of the collecting layer 13 and the deep layer 22 of the collecting layer 13". "A value of the depth axis (the x-axis)" of an intersection between the line β indicating the above "pore surface area of the region where the only partition wall parent material 1 is present" and the line γ indicating "the pore surface area of the portion where the deep layer 22 and the partition wall parent material 1 are mixed" is a depth D2 of "a boundary portion between the region where the deep layer 22 of the collecting layer 13 and the partition wall parent material 1 are mixed and the region where the only partition wall parent material 1 is present".

Therefore, when the depth of "the boundary portion between the surface layer 21 of the collecting layer 13 and the deep layer 22 of the collecting layer 13" is subtracted from the depth of "the boundary portion between the region where the deep layer 22 of the collecting layer 13 and the partition wall parent material 1 are mixed and the region where the only partition wall parent material 1 is present", the thickness of the deep layer 22 of the collecting layer 13 (the thickness of the region where the deep layer 22 of the collecting layer 13 and the partition wall parent material 1 are mixed) is obtained. Moreover, the depth of "the boundary portion between the surface layer 21 of the collecting layer 13 and the deep layer 22 of the collecting layer 13" is the same as the thickness of the surface layer 21 of the collecting layer 13.

In the honeycomb filter 100 of the present embodiment, a porosity of "a portion which does not penetrate into the pores of the partition wall parent material 1" (the surface layer 21) in the collecting layer 13 is preferably 60% or larger, further preferably from 70 to 90%, and especially preferably from 80 to 90% (see FIG. 4). When the porosity is smaller than 60%, the initial pressure loss becomes high sometimes. The porosity of the surface layer 21 is a value obtained by the scanning type electron microscope (SEM) image. Specifically, the SEM image of a cross section of the surface layer is acquired, and a ratio of "a total of areas of pores in the surface layer" to "the area of the whole surface layer" is calculated from "the SEM image of the surface layer", to obtain "the porosity (%) of the surface layer". The SEM image is an image having a magnification of 200 times and a size of 960×1280 pixels.

In the honeycomb filter 100 of the present embodiment, an average pore diameter of the pores of the surface layer 21 is preferably from 0.5 to 10 μm, further preferably from 1 to 5 μm, and especially preferably from 1 to 3 μm. When the average pore diameter is smaller than 0.5 μm, the initial pressure loss becomes high sometimes. When the average pore diameter is larger than 10 μm, the initial collecting efficiency when the PM in the exhaust gas is collected lowers sometimes. The average pore diameter is a value measured by a bubble point/half dry process (ASTM E1294-89).

In the honeycomb filter 100 of the present embodiment, the thickness of the collecting layer 13 is preferably from 1 to 30% of that of "the partition wall 23 including the partition wall parent material 1 and the collecting layer 13 disposed on the partition wall parent material 1", further preferably from 3 to 20%, and especially preferably from 5 to 10%. When the thickness is smaller than 1% and the PM in the exhaust gas is collected, the PM penetrates into the porous partition walls, to clog the pores of the partition walls. The pressure loss increases sometimes. When the thickness is larger than 30%, the initial pressure loss becomes high sometimes. In the honeycomb filter 100 of the present embodiment, "the thickness of the collecting layer 13" means "the thickness of the surface layer 21" of the collecting layer 13.

In the honeycomb filter 100 of the present embodiment, as a material of the collecting layer 13, a ceramic is preferable. Owing to an excellent heat resistance, at least one selected from the group consisting of cordierite, silicon carbide, mullite, alumina, spinel, aluminum titanate, silicon nitride, zirconia, titania, zirconium silicate and silica is further preferable. Furthermore, the material of the collecting layer 13 further preferably contains at least one selected from the group consisting of alumina, mullite and spinel, and is especially preferably at least one selected from the group consisting of alumina, mullite and spinel.

The collecting layer 13 is preferably formed in a region of 30% or larger of the surface of the partition wall parent material 1 in the inflow cells 2a, further preferably formed in a region of 50% or larger, and especially preferably formed in a region of 100%. When the region is smaller than 30%, an effect of enhancing the initial collecting efficiency lowers sometimes. Moreover, the collecting layer 13 is preferably formed in at least a range of a length of 30% or larger of a length of the honeycomb base material from the outflow-side end surface 12 of the honeycomb base material to the inflow-side end surface 11 in "the cell extending direction". Furthermore, the collecting layer 13 preferably is not formed in part of the above "region", but is formed in the whole "region".

In the honeycomb filter 100 of the present embodiment, the pore surface area per unit volume of the partition wall 23 is preferably from 1.4 to 20 $m^2/cm^3$, further preferably from 1.5 to 17 $m^2/cm^3$, and especially preferably from 4 to 17 $m^2/cm^3$. When the pore surface area is smaller than 1.4 $m^2/cm^3$, the initial collecting efficiency when the PM in the exhaust gas is collected deteriorates sometimes. When the pore surface area is larger than 20 $m^2/cm^3$, the initial pressure loss increases sometimes. Moreover, "the pore surface area per unit volume of the partition wall 23" is a value obtained by multiplying "a specific surface area" by "a density". The specific surface area is measured by using a flow type specific surface area automatic measuring apparatus (trade name: Flow Sorb manufactured by Micromeritics Co.). As a measurement gas, krypton is used. The density is measured by using a dry type automatic densimeter (trade name: Accupyc manufactured by Micromeritics Co.). As a measuring gas, helium is used.

In the partition wall parent material 1, the average pore diameter is preferably from 10 to 60 μm, and the porosity is preferably from 40 to 70%. The average pore diameter is further preferably from 20 to 50 μm, and the porosity is further preferably from 50 to 65%. The average pore diameter is especially preferably from 20 to 30 μm, and the porosity is especially preferably from 55 to 65%. When the average pore diameter is smaller than 10 μm or the porosity is smaller than 40%, the initial pressure loss becomes high sometimes. Moreover, when the average pore diameter is larger than 60 μm or the porosity is larger than 70%, a strength of the honeycomb filter lowers sometimes. The average pore diameter is a value measured with a mercury porosimeter. The porosity is a value measured with the mercury porosimeter.

A thickness of the partition wall parent material 1 is preferably from 100 to 500 μm, further preferably from 200 to 400 μm, and especially preferably from 300 to 350 μm. When the thickness is smaller than 100 μm, the strength of the honeycomb filter lowers sometimes. When the thickness is larger than 500 μm, the initial pressure loss becomes high sometimes.

In the honeycomb filter 100 of the present embodiment, there are not any special restrictions on a shape of the honeycomb base material 4. For example, a cylindrical shape, a tubular shape with an elliptic end surface, a polygonal tubular shape with "a square, rectangular, triangular, pentangular, hexagonal, octagonal or another" end surface and the like are preferable. In the honeycomb filter 100 shown in FIG. 1, the shape is the cylindrical shape. Moreover, the honeycomb filter 100 shown in FIG. 1 includes an outer peripheral wall 3, but does not have to include the outer peripheral wall 3. The outer peripheral wall 3 is preferably formed together with the partition wall parent material, when a honeycomb formed body is formed by extrusion in a process of preparing the honeycomb filter. Moreover, the outer peripheral wall 3 may be formed by coating the outer periphery of the honeycomb filter with a ceramic material.

In the honeycomb filter 100 of the present embodiment, a material of the honeycomb base material 4 is preferably a ceramic. Owing to excellent strength and heat resistance, at least one selected from the group consisting of cordierite, silicon carbide, a silicon-silicon carbide composite material, mullite, alumina, aluminum titanate, silicon nitride, and a silicon carbide-cordierite composite material is further preferable. Among these materials, cordierite is especially preferable.

In the honeycomb filter 100 of the present embodiment, there are not any special restrictions on a cell density of the honeycomb base material 4, but the cell density is preferably from 16 to 96 $cells/cm^2$, and further preferably from 32 to 64 $cells/cm^2$. When the cell density is smaller than 16 $cells/cm^2$, the area of the partition walls to collect the particulate matter becomes small. When the exhaust gas flows through the cells, the pressure loss becomes large in a short time sometimes. When the cell density is larger than 96 cells/cm$^2$, a cell sectional area (the area of a cross section orthogonal to the cell extending direction) becomes small. Therefore, the pressure loss becomes large sometimes.

Moreover, in the honeycomb filter 100 of the present embodiment, a material of the partition wall parent material 1 is preferably cordierite, and the material of the collecting layer 13 preferably contains at least one selected from the group consisting of alumina, mullite and spinel.

When a conventional honeycomb filter which is not provided with the collecting layer is used as a filter to treat the PM-containing exhaust gas, the PM penetrates into the pores of the partition walls to clog the pores, and hence there has been a problem that the pressure loss rapidly rises. On the other hand, in the honeycomb filter of the present invention, the collecting layer is formed on the surfaces of the partition walls in the inflow cells. Therefore, the PM is collected by the collecting layer, and can be prevented from penetrating into the pores of the partition walls. It is possible to suppress the rapid rise of the pressure loss. Moreover, in the honeycomb filter of the present invention, the thickness of the collecting layer is uniform, and hence it is possible to further suppress the rise of the pressure loss.

In the honeycomb filter 100 of the present embodiment, the plugged portions 5 are disposed in the open frontal areas of "the predetermined cells 2" in the end surface 11 on the inflow side of the fluid and in the open frontal areas of "the remaining cells 2" in the end surface 12 on the outflow side of the fluid. The plugged portions 5 are arranged to clog the ends of the cells 2, respectively, and are formed so that the gas does not pass through the plugged portions. In the honeycomb filter 100, the "predetermined cells 2" and "the remaining cells 2" are preferably alternately arranged so that checkered patterns are formed by the cell open frontal areas and the plugged portions 5 in both the end surfaces.

A material of the plugged portions 5 is preferably the same as that of the partition wall parent material 1 of the honeycomb base material 4.

(2) Manufacturing Method of Honeycomb Filter:

An embodiment of a manufacturing method of a honeycomb filter of the present invention includes a forming step of forming a ceramic forming raw material containing a ceramic raw material, and forming a honeycomb formed body including a non-fired partition wall parent material to partition and form a plurality of cells which become through channels of a fluid; a first plugging step of arranging plugged portions in open frontal areas of the predetermined cells in an end surface of the honeycomb formed body on an inflow side of the fluid; an aqueous electrolyte solution coating step of attaching an aqueous electrolyte solution having a concentration of 50 to 100% of a saturated solubility to the surface of the non-fired partition wall parent material in the remaining cells of the honeycomb formed body which are not provided with the plugged portions; an electrolyte film forming step of drying the aqueous electrolyte solution to form an electrolyte film on the surface of the non-fired partition wall parent material in the cells; a collecting layer forming raw material coating step of attaching "a collecting layer forming raw material containing a ceramic raw material for a collecting layer which has a higher melting point than the ceramic raw material, and an aqueous electrolyte solution having a concentration of 50 to 100% of a saturated solubility" to the surface of the electrolyte film formed on the surface of the non-fired partition wall parent material; a second plugging step of arranging plugged portions in open frontal areas of the remaining cells in an end surface of the honeycomb formed body on an outflow side of the fluid; and a firing step of firing the honeycomb formed body coated with the electrolyte film and the collecting layer forming raw material to prepare the honeycomb filter.

Thus, according to the embodiment of the manufacturing method of the honeycomb filter of the present invention, "the aqueous electrolyte solution having the concentration of 50 to 100% of the saturated solubility" is attached to the surface of the non-fired partition wall parent material in the remaining cells of the honeycomb formed body, and the aqueous electrolyte solution is dried to form the electrolyte film on the surface of the non-fired partition wall parent material in the cells. The collecting layer forming raw material containing "the ceramic raw material for the collecting layer which has a higher melting point than the ceramic raw material, and the aqueous electrolyte solution having the concentration of 50 to 100% of the saturated solubility" is attached to the surface of the electrolyte film formed on the surface of the non-fired partition wall parent material, and then fired. Therefore, it is possible to obtain a honeycomb filter (the honeycomb filter including the collecting layer on the surface of the partition wall parent material) in which a thickness of "a portion positioned in a corner portion of each cell" of the collecting layer is from one to three times that of "a portion positioned in the center of a side of the cell" of the collecting layer.

Hereinafter, each step of the manufacturing method of the honeycomb filter of the present embodiment will be described.

Figure 5:
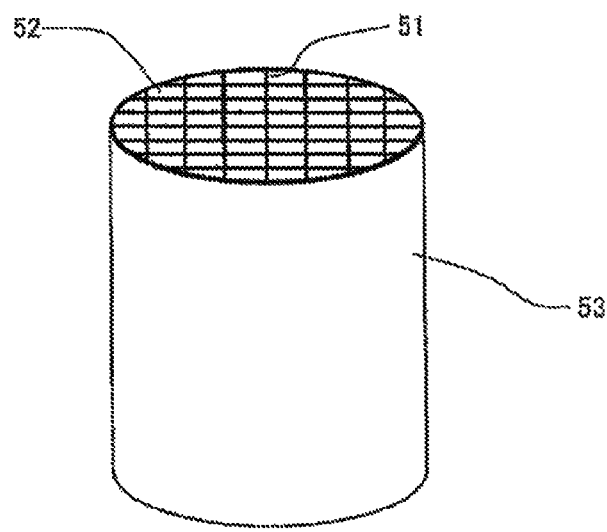
FIG. 5 is a perspective view schematically showing a honeycomb formed body prepared in a forming step of an embodiment of a manufacturing method of a honeycomb filter according to the present invention.
Figure 6:
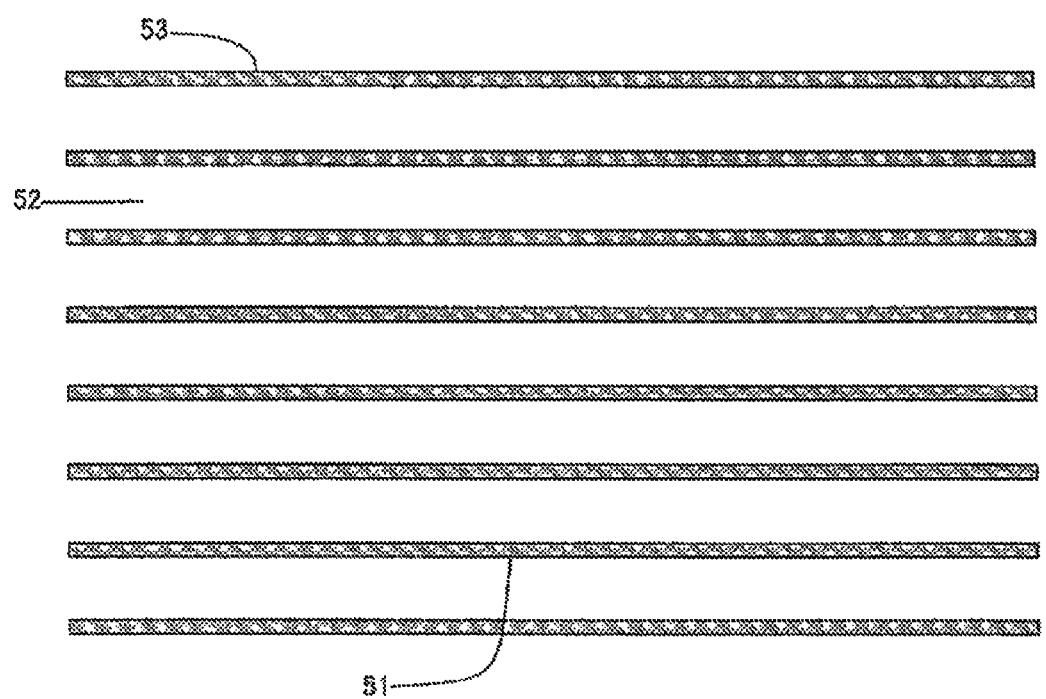
FIG. 6 is a schematic view showing a cross section of the honeycomb formed body prepared in the forming step of the embodiment of the manufacturing method of the honeycomb filter according to the present invention, which is parallel to a cell extending direction.

(2-1) Forming Step:

First, in a forming step, a ceramic forming raw material containing a ceramic raw material is formed into a honeycomb formed body (the formed body of a honeycomb configuration) 50 including a non-fired partition wall parent material 51 to partition and form a plurality of cells 52 which become through channels of a fluid as shown in FIG. 5 and FIG. 6. The honeycomb formed body 50 shown in FIG. 5 and FIG. 6 includes an outer peripheral wall 53. FIG. 5 is a perspective view schematically showing the honeycomb formed body 50 prepared in the forming step of the embodiment of the manufacturing method of the honeycomb filter according to the present invention. FIG. 6 is a schematic view showing a cross section of the honeycomb formed body 50 prepared in the forming step of the embodiment of the manufacturing method of the honeycomb filter according to the present invention, which is parallel to an extending direction of the cells 52.

The ceramic raw material contained in the ceramic forming raw material is preferably at least one selected from the group consisting of a cordierite forming raw material, cordierite, silicon carbide, a silicon-silicon carbide composite material, mullite, alumina, aluminum titanate, silicon nitride, and a silicon carbide-cordierite composite material. It is to be noted that the cordierite forming raw material is a ceramic raw material blended to obtain a chemical composition in a range in which silica is from 42 to 56 mass %, alumina is from 30 to 45 mass %, and magnesia is from 12 to 16 mass %, and the raw material is fired to become cordierite.

Moreover, this ceramic forming raw material is preferably prepared by mixing the above ceramic raw material with a dispersion medium, an organic binder, an inorganic binder, a pore former, a surfactant and the like. There are not any special restrictions on composition ratios of the respective raw materials, and the composition ratios are preferably set in accordance with a configuration, a material and the like of a honeycomb filter to be prepared.

To regulate a pore surface area, average pore diameter, porosity and the like of the partition wall parent material of the honeycomb filter to be prepared, the respective raw materials are further preferably regulated as follows.

As the ceramic raw material, talc, kaolin, alumina and silica are preferably used. An average particle diameter of talc is preferably from 10 to 30 µm. An average particle diameter of kaolin is preferably from 1 to 10 µm. An average particle diameter of alumina is preferably from 1 to 20 µm. An average particle diameter of silica is preferably from 1 to 60 µm. Moreover, as the pore former, starch, carbon, resin balloon, polymethyl methacrylate (PMMA), a water absorbing resin or a combination of them is preferably used. Moreover, an average particle diameter of the pore former is preferably from 10 to 100 µm. Furthermore, an amount of the pore former to be added is preferably from 0.5 to 10 parts by mass with respect to 100 parts by mass of the ceramic raw material. Moreover, as the organic binder, methylcellulose, hydroxypropyl methylcellulose, hydroxypropyl ethylcellulose, hydroxyethylcellulose, carboxymethylcellulose, polyvinyl alcohol, or a combination of them is preferably used. Furthermore, an amount of the organic binder to be added is preferably from 1 to 10 parts by mass with respect to 100 parts by mass of the ceramic raw material.

When the ceramic forming raw material is formed, the ceramic forming raw material is first kneaded to form a kneaded material, and the obtained kneaded material is preferably formed in a honeycomb shape, to obtain a honeycomb formed body. There are not any special restrictions on a method of kneading the ceramic forming raw material to form the kneaded material, and examples of the method include methods using a kneader, a vacuum clay kneader and the like. There are not any special restrictions on a method of forming the kneaded material into the honeycomb formed body, and a known forming method such as extrusion-forming or injection-forming can be used. Preferable examples of the method include a method of extruding the kneaded material to form the honeycomb formed body by use of a die having a desirable cell shape, partition wall thickness and cell density. As a material of the die, a hard metal which is not easily worn is preferable.

There are not any special restrictions on a shape of the honeycomb formed body. A cylindrical shape shown in FIG. 5, a tubular shape with an elliptic end surface, a polygonal tubular shape with "a square, rectangular, triangular, pentangular, hexagonal, octagonal or another" end surface and the like are preferable. Moreover, in a cross section of the honeycomb formed body which is orthogonal to an cell extending direction, a shape of the cells 2 is preferably rectangular or square.

Moreover, the obtained honeycomb formed body may be dried. There are not any special restrictions on a drying method, but examples of the method include hot air drying, microwave drying, dielectric drying, reduced pressure drying, vacuum drying, and freeze drying. Above all, the dielectric drying, the microwave drying or the hot air drying is preferably performed alone or as a combination of them.

It is to be noted that the honeycomb formed body is fired after coating the non-fired partition wall parent material (the surface of the electrolyte film) with the collecting layer forming raw material, and is not fired prior to coating the non-fired partition wall parent material (the surface of the electrolyte film) with the collecting layer forming raw material.

Figure 7:
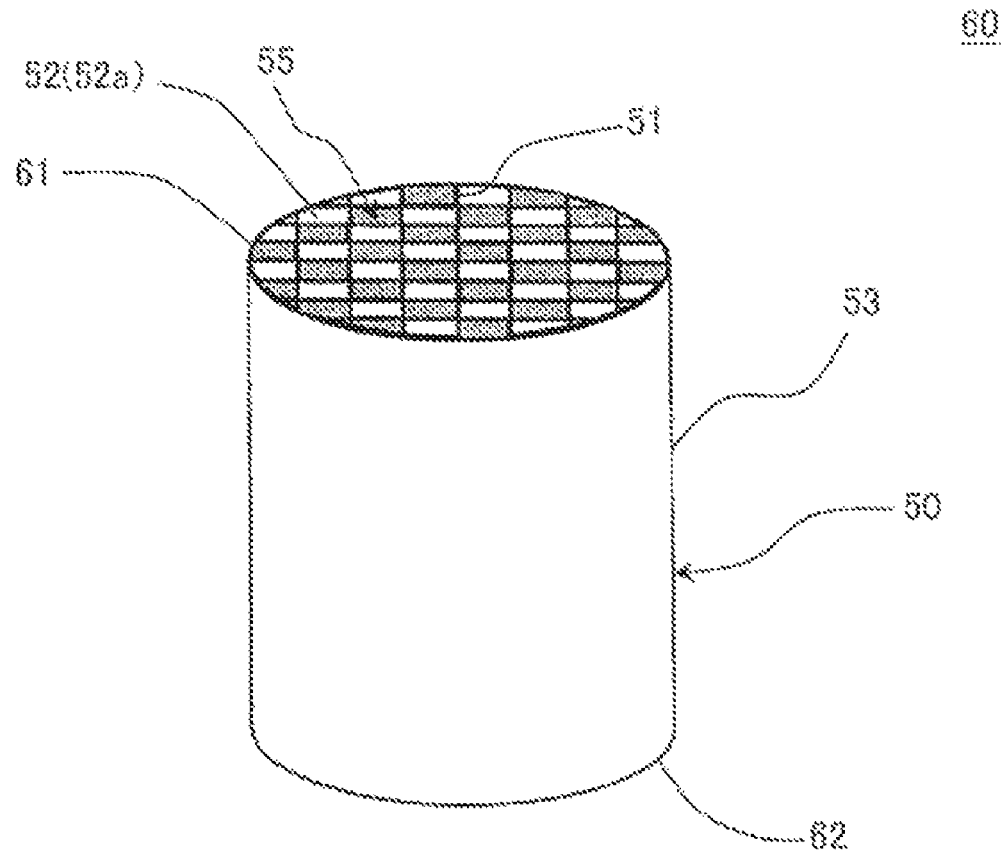
FIG. 7 is a perspective view schematically showing a one-side plugged honeycomb formed body prepared in a first plugging step of the embodiment of the manufacturing method of the honeycomb filter according to the present invention.
Figure 8:
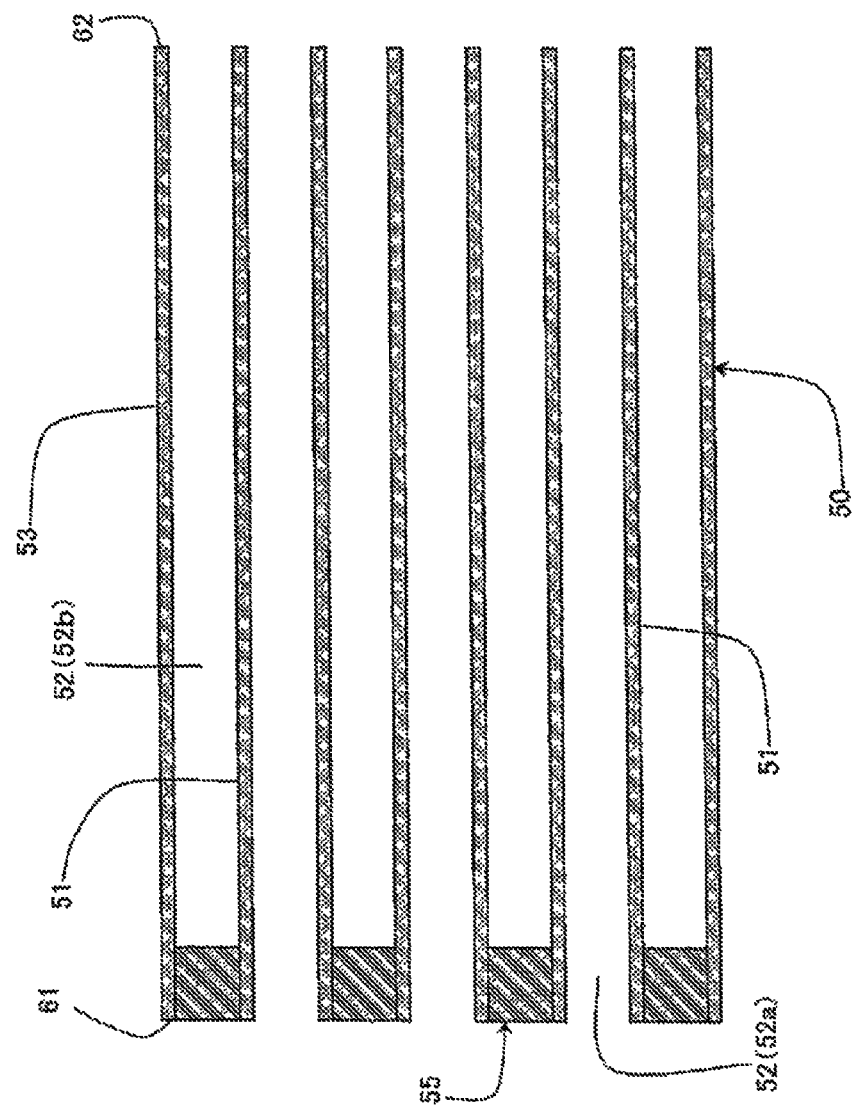
FIG. 8 is a schematic view showing a cross section of the one-side plugged honeycomb formed body prepared in the first plugging step of the embodiment of the manufacturing method of the honeycomb filter according to the present invention, which is parallel to the cell extending direction.

(2-2) First Plugging Step:

Next, after the forming step, as shown in FIG. 7 and FIG. 8, plugged portions 55 are arranged in open frontal areas of the predetermined cells 52 (outflow cells 52b) in an end surface 61 on an inflow side of a fluid in the honeycomb formed body 50 (a first plugging step). The plugged portions 55 are arranged in the honeycomb formed body 50 to form a one-side plugged honeycomb formed body 60. FIG. 7 is a perspective view schematically showing the one-side plugged honeycomb formed body 60 prepared in the first plugging step of the embodiment of the manufacturing method of the honeycomb filter according to the present invention. FIG. 8 is a schematic view showing a cross section of the one-side plugged honeycomb formed body 60 prepared in the first plugging step of the embodiment of the manufacturing method of the honeycomb filter according to the present invention, which is parallel to the extending direction of the cells 52.

When the honeycomb formed body is charged with a plugging material, the one end surface side is charged with the plugging material. Examples of a method of charging the one end surface side with the plugging material include a method including a masking step of attaching a sheet to the one end surface of the honeycomb formed body to make holes at positions which overlap with "the cells to be provided with the plugged portions" in the sheet, and a pressure pouring step of placing, under pressure, "the end of the honeycomb formed body to which the sheet is attached" into a container in which the plugging material is stored, to pour, under pressure, the plugging material into the cells of the honeycomb formed body. When the plugging material is poured under pressure into the cells of the honeycomb formed body, the plugging material passes through the holes formed in the sheet to charge the only "cells which communicate with the holes formed in the sheet".

The plugging material can be prepared by suitably mixing raw materials as examples of constitutional elements of the ceramic forming raw material. The ceramic raw material contained in the plugging material is preferably the same as that for use as a raw material of the partition wall parent material.

Next, the plugging material with which the honeycomb formed body is charged is preferably dried.

In the one-side plugged honeycomb formed body 60 shown in FIG. 7 and FIG. 8, inflow cells 52a and the outflow cells 52b are preferably alternately arranged so that the plugged portions 55 and the open frontal areas of the cells 52 form a checkered pattern in the one end surface (the inflow-side end surface 61) provided with the plugged portions. It is to be noted that in the first plugging step, any plugged portions are not formed in the other end surface (an outflow-side end surface 62) of the honeycomb formed body.

Figure 9:
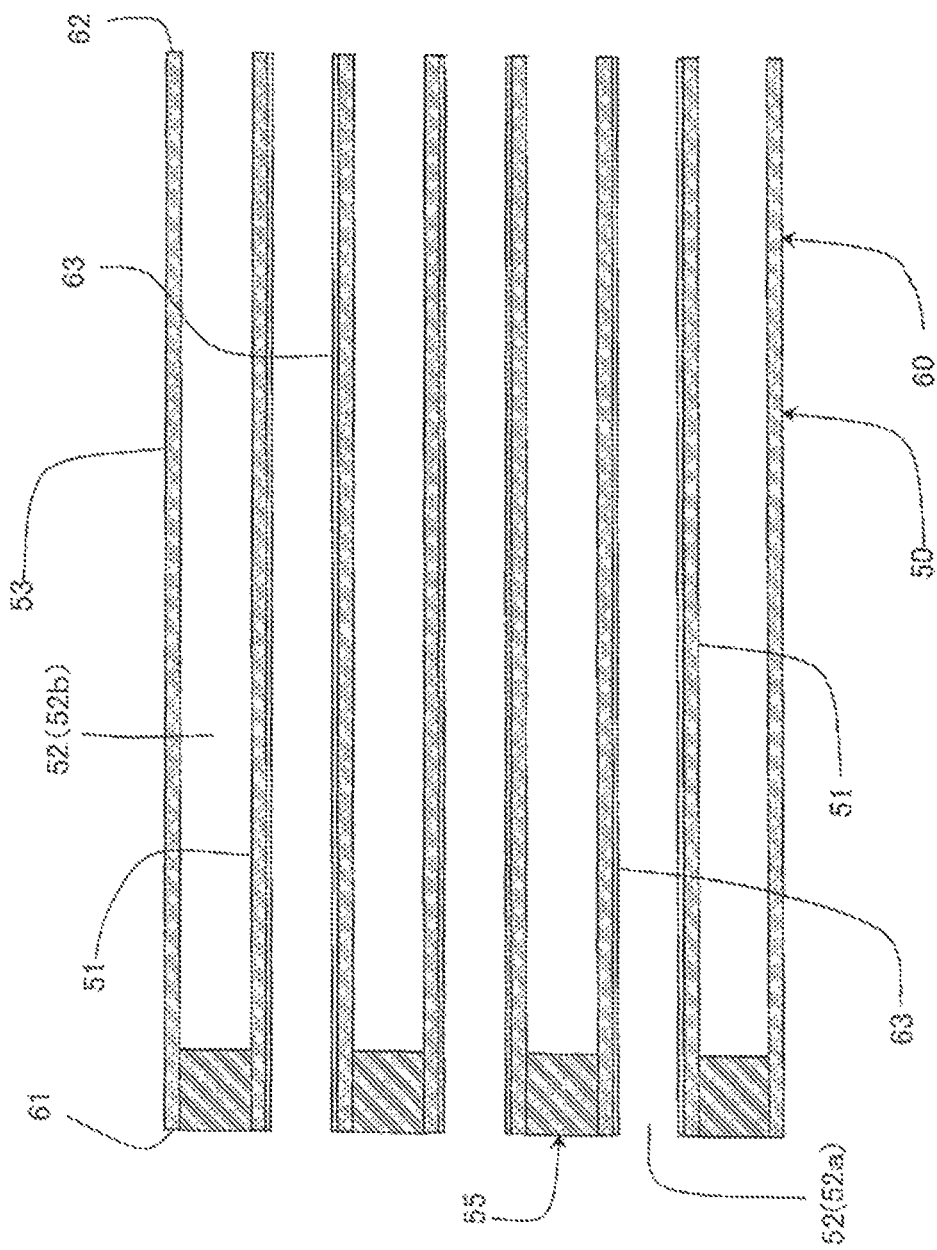
FIG. 9 is a schematic view showing a cross section of the one-side plugged honeycomb formed body with an aqueous electrolyte solution film prepared in an aqueous electrolyte solution coating step in the embodiment of the manufacturing method of the honeycomb filter according to the present invention, which is parallel to the cell extending direction.
Figure 10:
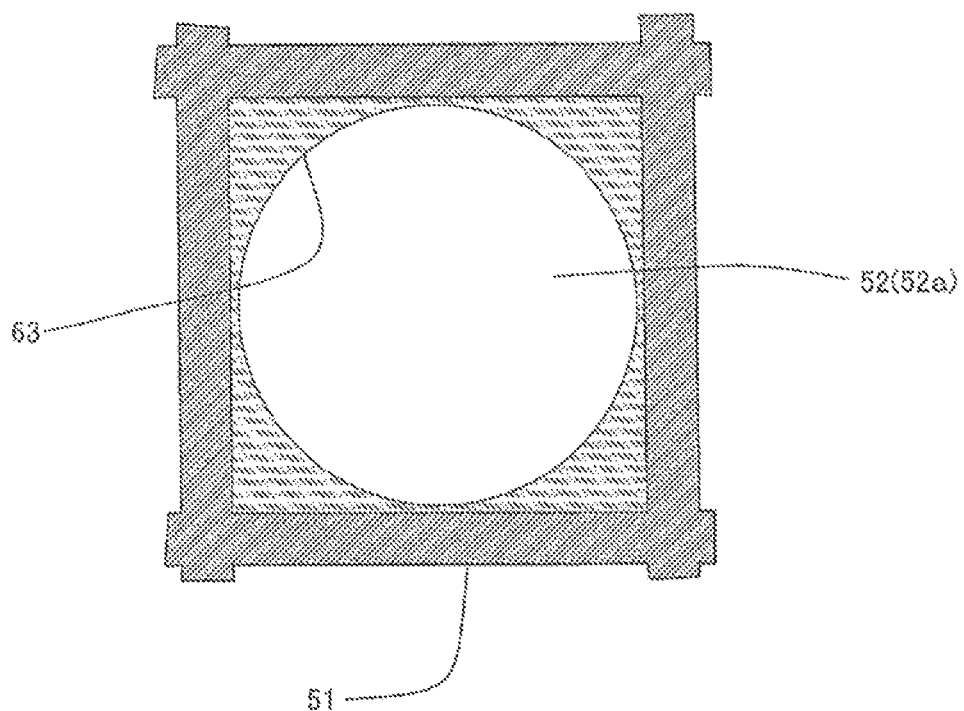
FIG. 10 is a schematic view showing a cross section of the one-side plugged honeycomb formed body with the aqueous electrolyte solution film prepared in the aqueous electrolyte solution coating step in the embodiment of the manufacturing method of the honeycomb filter according to the present invention, which is orthogonal to the cell extending direction.

(2-3) Aqueous Electrolyte Solution Coating Step:

Next, as shown in FIG. 9 and FIG. 10, "the aqueous electrolyte solution having the concentration of 50 to 100% of the saturated solubility" is attached to the surface of a non-fired partition wall parent material 51 in the remaining cells 52 (the inflow cells 52a) of the honeycomb formed body (the one-side plugged honeycomb formed body 60) in which any plugged portions are not disposed (an aqueous electrolyte solution coating step). The cells 52 which are not provided with the plugged portions are referred to as "the remaining cells", and the above "predetermined cells" and "the remaining cells" are combined to form all the cells. Moreover, the "remaining cells 52" become the inflow cells 52a. As shown in FIG. 9, the aqueous electrolyte solution is attached to the surface of the non-fired partition wall parent material 51 in the remaining cells 52 (the inflow cells 52a) of the honeycomb formed body 50 (the one-side plugged honeycomb formed body 60), to form an aqueous electrolyte solution film 63 on the surface of the non-fired partition wall parent material 51. "A one-side plugged honeycomb formed body 70 with the aqueous electrolyte solution film" can be prepared. FIG. 9 is a schematic view showing a cross section of the one-side plugged honeycomb formed body 70 with the aqueous electrolyte solution film prepared in the aqueous electrolyte solution coating step in the embodiment of the manufacturing method of the honeycomb filter according to the present invention, which is parallel to the cell extending direction. FIG. 10 is a schematic view showing a cross section of the one-side plugged honeycomb formed body 70 with the aqueous electrolyte solution film prepared in the aqueous electrolyte solution coating step in the embodiment of the manufacturing method of the honeycomb filter according to the present invention, which is orthogonal to the cell extending direction.

The non-fired honeycomb formed body (the one-side plugged honeycomb formed body 60) does not include any pores. Therefore, when the non-fired honeycomb formed body is coated with the aqueous electrolyte solution, the aqueous electrolyte solution can be prevented from penetrating into the non-fired partition wall parent material. When the fired honeycomb formed body is coated with the aqueous electrolyte solution, a large amount of the aqueous electrolyte solution unfavorably penetrates into "the porous partition wall parent material".

The aqueous electrolyte solution contains, as the electrolyte, at least one anion selected from the group consisting of a citrate ion, a tartrate ion, an acetate ion and a chloride ion, and at least one cation selected from the group consisting of an alkali earth metal ion (including a magnesium ion), a hydrogen ion and an ammonium ion (the electrolyte is shown by a pair of ions). Examples of the electrolyte to be dissolved in the aqueous electrolyte solution include a citric acid, a tartaric acid, an acetic acid, magnesium citrate, magnesium tartrate, magnesium acetate, ammonium citrate, ammonium tartrate, ammonium acetate, and ammonium chloride (the electrolyte is shown by a substance name). Among these electrolytes, the citric acid is preferable. When the surface of the non-fired partition wall parent material is coated with such an aqueous electrolyte solution, the aqueous electrolyte solution can be prevented from permeating the non-fired partition wall parent material.

A concentration of the electrolyte contained in the aqueous electrolyte solution is from 50 to 100% of a saturated solubility, preferably from 70 to 100% of the saturated solubility, and further preferably from 90 to 100% of the saturated solubility. When the concentration of the electrolyte contained in the aqueous electrolyte solution is smaller than 50% of the saturated solubility, an amount of the aqueous electrolyte solution to form the electrolyte film having a desirable thickness (amount) becomes excessively large. Therefore, the honeycomb formed body absorbs a large amount of "water in the aqueous electrolyte solution", and the strength of the honeycomb formed body lowers sometimes. It is to be noted that "the saturated solubility" of the aqueous electrolyte solution is a saturated solubility at 20° C.

The aqueous electrolyte solution film 63 is preferably formed in a region of 30% or larger of the surface of the non-fired partition wall parent material 51 in the inflow cells 52a, further preferably formed in a region of 50% or larger, and especially preferably formed in a region of 100%. Consequently, in the obtained honeycomb filter, the collecting layer 13 can preferably be formed in a desirable region (preferably 30% or larger, further preferably 50% or larger, and especially preferably 100%) of the surface of the partition wall parent material 1 in the inflow cells 2a.

There are not any special restrictions on a method of attaching the aqueous electrolyte solution to the surface of the non-fired partition wall parent material 51 in the remaining cells 52 (the inflow cells 52a). For example, a method of immersing the honeycomb filter into the aqueous electrolyte solution (dip coating) or a method of pouring the aqueous electrolyte solution into the cells of the honeycomb filter is preferable. By such a method, the surface of the non-fired partition wall parent material in the cells can uniformly be coated with the aqueous electrolyte solution. Moreover, the number of coating times with the aqueous electrolyte solution is preferably the number of the times with which a desirable thickness is obtained. The number of the coating times with the aqueous electrolyte solution may be one or a plurality of times, but once or twice is preferable.

(2-4) Electrolyte Film Forming Step:

Next, the aqueous electrolyte solution is dried, to form an electrolyte film 63a (see FIG. 11) on the surface of the non-fired partition wall parent material in the cells (the electrolyte film forming step). The electrolyte film is a film formed by the electrolyte contained in the aqueous electrolyte solution. A thickness of the electrolyte film is preferably from 5 to 30 µm, and further preferably from 10 to 20 µm. When the thickness is smaller than 5 µm, the thickness of the collecting layer does not easily become uniform in the obtained honeycomb filter. When the thickness is larger than 30 µm, the collecting layer does not easily come in contact closely with the partition walls in the obtained honeycomb filter. The thickness of the electrolyte film is a value obtained by dividing a volume of the coated electrolyte film by a partition wall surface area of the honeycomb formed body which is coated with the electrolyte film.

A temperature when the aqueous electrolyte solution is dried is preferably from 60 to 150° C., further preferably from 80 to 120° C., and especially preferably from 80 to 100° C. When the temperature is higher than 150° C., the electrolyte film melts sometimes. When the temperature is lower than 60° C., much time is required for evaporating a moisture sometimes. There are not any special restrictions on a drying time, but the time is preferably from about 0.1 to 1 hour.

Figure 11:
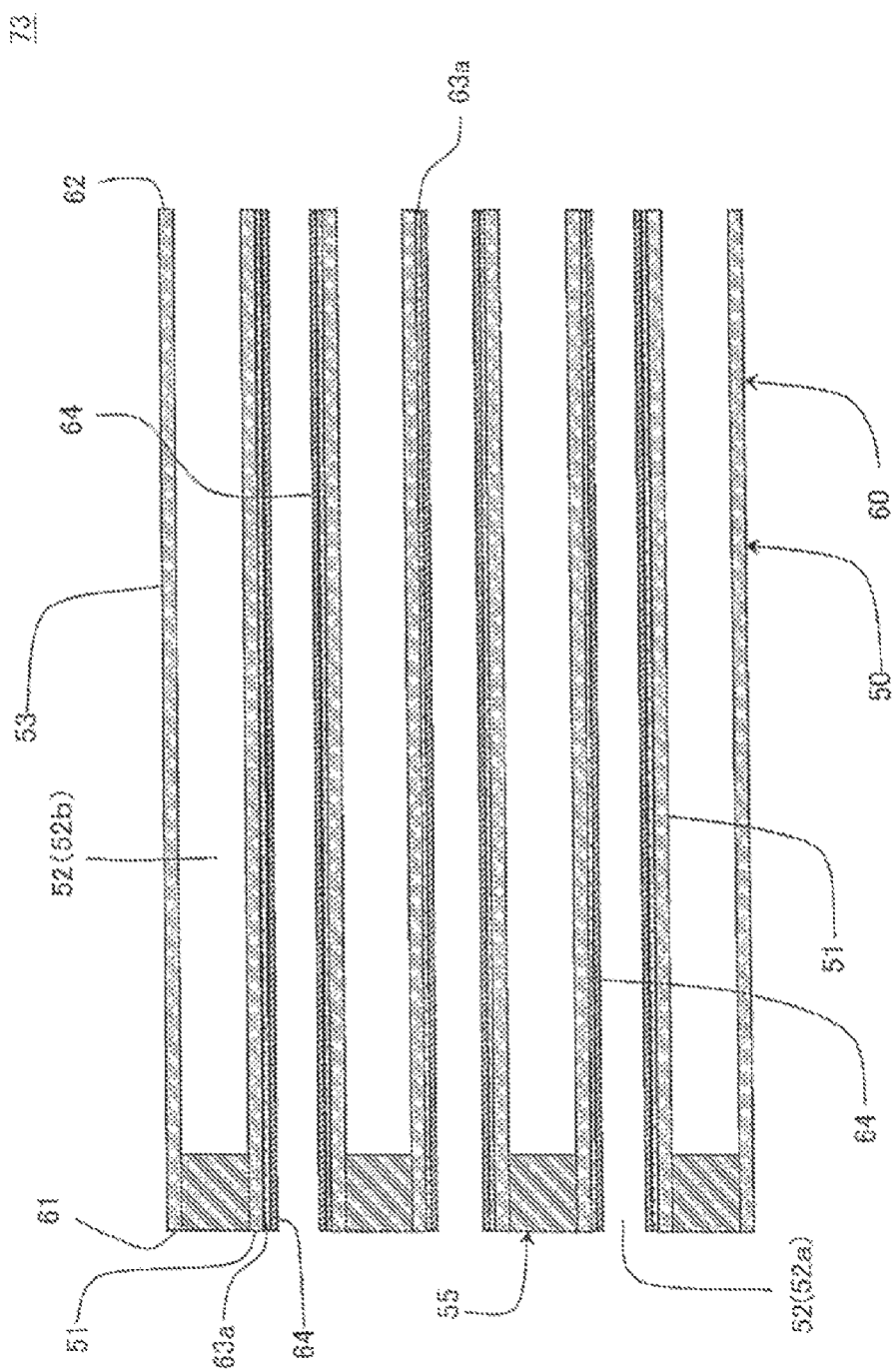
FIG. 11 is a schematic view showing a cross section of the one-side plugged honeycomb formed body with a non-fired collecting layer prepared in a collecting layer forming raw material coating step in the embodiment of the manufacturing method of the honeycomb filter according to the present invention, which is parallel to the cell extending direction.
Figure 12:
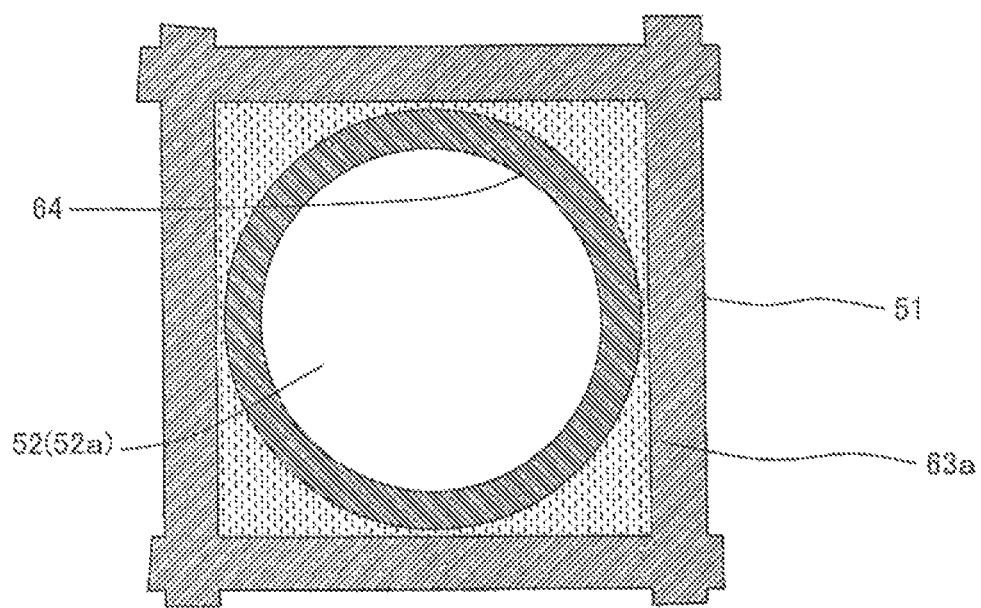
FIG. 12 is a schematic view showing part of a cross section of the one-side plugged honeycomb formed body with the non-fired collecting layer prepared in the collecting layer forming raw material coating step in the embodiment of the manufacturing method of the honeycomb filter according to the present invention, which is orthogonal to the cell extending direction.

(2-5) Collecting Layer Forming Raw Material Coating Step:

Next, as shown in FIG. 11 and FIG. 12, "a collecting layer forming raw material containing a ceramic raw material for the collecting layer which has a higher melting point than the ceramic raw material, and an aqueous electrolyte solution having a concentration of 50 to 100% of a saturated solubility" is attached to the surface of the electrolyte film 63a formed on the surface of the non-fired partition wall parent material 51 (a collecting layer forming raw material coating step). As shown in FIG. 11 and FIG. 12, the collecting layer forming raw material is attached to the surface of the electrolyte film 63a in the remaining cells 52 (the inflow cells 52a) of the one-side plugged honeycomb formed body 60 provided with the electrolyte film 63a to form a non-fired collecting layer 64, whereby it is possible to obtain a one-side plugged honeycomb formed body 73 with the non-fired collecting layer. FIG. 11 is a schematic view showing a cross section of the one-side plugged honeycomb formed body 73 with the non-fired collecting layer prepared in the collecting layer forming raw material coating step in the embodiment of the manufacturing method of the honeycomb filter according to the present invention, which is parallel to the extending direction of the cells 52. FIG. 12 is a schematic view showing part of a cross section of the one-side plugged honeycomb formed body with the non-fired collecting layer prepared in the collecting layer forming raw material coating step in the embodiment of the manufacturing method of the honeycomb filter according to the present invention, which is orthogonal to the cell extending direction.

The collecting layer forming raw material for use in the collecting layer forming raw material coating step contains the ceramic raw material for the collecting layer and the aqueous electrolyte solution as described above. The ceramic raw material for the collecting layer has a higher melting point than the ceramic raw material (the raw material of the partition wall parent material), and the concentration of the aqueous electrolyte solution in the collecting layer forming raw material is from 50 to 100% of the saturated solubility. The collecting layer forming raw material is preferably in a slurried state. Here, "the aqueous electrolyte solution contained in the collecting layer forming raw material" means an aqueous solution (the aqueous solution contained in the collecting layer forming raw material) including "the water in the collecting layer forming raw material" and "the electrolyte contained in the collecting layer forming raw material and dissolved in the water". Moreover, "the concentration of the aqueous electrolyte solution in the collecting layer forming raw material" means a ratio of "an amount of the electrolyte" in the collecting layer forming raw material with respect to a total of "an amount of the water" and "the amount of the electrolyte" in the collecting layer forming raw material.

Thus, the surface of the electrolyte film 63a formed on the surface of the non-fired partition wall parent material 51 is coated with the collecting layer forming raw material (is attached), whereby the surface can uniformly be coated with the collecting layer forming raw material. A thickness of the formed non-fired collecting layer 64 can be uniform. It is to be noted that the collecting layer forming raw material which coats the surface of the electrolyte film 63a becomes the non-fired collecting layer 64.

The non-fired partition wall parent material in the cells of the honeycomb formed body is usually coated with a liquid or a slurry. Then, as shown in FIG. 10, "portions corresponding to corner portions of the cell 52 in the non-fired partition wall parent material 51" are formed at right angles (have a vertex of an angle 90°), and hence the portions corresponding to the corner portions of the cell 52 are thickly coated with the liquid. This is because the liquid or the slurry is easily deposited on the vertex portions of the cell having an angle of 90° or the like partly owing to an influence of a surface tension of the liquid (the water) or the like. Therefore, it is difficult to form a film having a uniform thickness by coating the non-fired partition wall parent material of the honeycomb formed body directly with the liquid or the slurry. On the other hand, when the non-fired partition wall parent material in the cells of the honeycomb formed body is coated with the aqueous electrolyte solution, the aqueous electrolyte solution is dried to form the electrolyte film and the surface of the electrolyte film is coated with the collecting layer forming raw material, it is possible to coat the surface with the collecting layer forming raw material having a uniform thickness. As shown in FIG. 12, in the electrolyte film 63a disposed on the non-fired partition wall parent material 51, the surface of the electrolyte film 63a is formed in a smoothly curved shape in the portions corresponding to the corner portions of the cell 52. Therefore, on the surface of the electrolyte film 63a, a film of the collecting layer forming raw material having a uniform thickness (the non-fired collecting layer) is formed.

Moreover, the collecting layer forming raw material contains "the aqueous electrolyte solution having a concentration of 50 to 100% of the saturated solubility". Therefore, in the collecting layer forming raw material coating step, it is possible to prevent the electrolyte film from being dissolved in the collecting layer forming raw material. Moreover, the melting point of the ceramic raw material for the collecting layer is higher than that of the ceramic raw material. Therefore, it is possible to suppress the decrease of the pore surface area per unit volume of the collecting layer due to the excessive melting of the ceramic raw material for the collecting layer, at the time of firing. It is to be noted that "the saturated solubility" of the aqueous electrolyte solution is the saturated solubility at 20° C.

The electrolyte contained in the collecting layer forming raw material preferably includes one anion selected from the group consisting of a citrate ion, a tartrate ion, an acetate ion and a chloride ion, and one cation selected from the group consisting of an alkali earth metal ion, a hydrogen ion and an ammonium ion (the electrolyte is illustrated by ions which form a pair). Examples of the electrolyte contained in the collecting layer forming raw material can include a citric acid, a tartaric acid, an acetic acid, magnesium citrate, magnesium tartrate, magnesium acetate, ammonium citrate, ammonium tartrate, ammonium acetate, and ammonium chloride (the electrolyte is illustrated by a substance name). Among these electrolytes, the citric acid is preferable.

The concentration of the aqueous electrolyte solution contained in the collecting layer forming raw material is from 50 to 100%, preferably from 70 to 100%, and further preferably from 90 to 100% of the saturated solubility in the collecting layer forming raw material. When the concentration is smaller than 50%, the electrolyte film is dissolved in the collecting layer forming raw material, and the thickness of the collecting layer forming raw material unfavorably becomes non-uniform.

A coating amount of the collecting layer forming raw material (the thickness of the dried non-fired collecting layer) is preferably from 20 to 120 μm, and further preferably from 30 to 60 μm. When the amount is smaller than 20 μm, the collecting layer becomes excessively thin sometimes. When the amount is larger than 120 μm, the collecting layer becomes excessively thick sometimes. The thickness of the dried non-fired collecting layer is a value obtained by dividing a volume of the dried non-fired collecting layer by an area of "a portion provided with the non-fired collecting layer" in the surfaces of the partition walls of the honeycomb formed body.

The melting point of the ceramic raw material for the collecting layer contained in the collecting layer forming raw material is higher than that of the ceramic raw material, and is preferably from 300 to 700° C. higher than the melting point of the ceramic raw material.

As the ceramic raw material for the collecting layer contained in the collecting layer forming raw material, at least one selected from the group consisting of a cordierite forming raw material, cordierite, silicon carbide, mullite, alumina, spinel, aluminum titanate, silicon nitride, zirconia, titania, zirconium silicate, and silica is preferable. Furthermore, the raw material preferably contains at least one selected from the group consisting of mullite, alumina and spinel, and is especially preferably at least one selected from the group consisting of mullite, alumina and spinel.

A specific surface area of the ceramic raw material for the collecting layer is preferably from 0.8 to 200 $m^2/g$, further preferably from 3 to 20 $m^2/g$, and especially preferably from 5 to 15 $m^2/g$. When the specific surface area is larger than 200 $m^2/g$, the pore surface area per unit volume of the collecting layer becomes excessively large. Therefore, cracks are generated in the collecting layer in the firing step sometimes. When the specific surface area is smaller than 0.8 $m^2/g$, the pore surface area per unit volume of the collecting layer becomes excessively small. Therefore, the initial collecting efficiency lowers sometimes. The specific surface area of the ceramic raw material for the collecting layer is a value measured by using a flow type specific surface area automatic measuring apparatus (trade name: Flow Sorb manufactured by Micromeritics Co.).

In the collecting layer forming raw material, a pore former, a viscosity regulator and the like are preferably contained, in addition to the ceramic raw material for the collecting layer and the aqueous electrolyte solution.

As the pore former, polymethyl methacrylate (PMMA), carbon, starch or the like can be used. Among these pore formers, carbon is preferable. A content of the pore former is preferably from 5 to 1000 parts by mass, further preferably from 10 to 100 parts by mass, and especially preferably from 40 to 80 parts by mass with respect to 100 parts by mass of the ceramic raw material for the collecting layer. When the content is smaller than 5 parts by mass, the initial pressure loss becomes high sometimes. When the content is larger than 1000 parts by mass, the initial collecting efficiency lowers sometimes.

An average particle diameter of the pore former is preferably from 0.5 to 50 μm, further preferably from 5 to 30 μm, and especially preferably from 5 to 20 μm. When the average particle diameter is larger than 50 μm, the initial collecting efficiency lowers sometimes. When the average particle diameter is smaller than 0.5 μm, the initial pressure loss becomes high sometimes. The average particle diameter of the pore former is a value measured by a laser diffraction scattering process.

As the viscosity regulator in the collecting layer forming raw material, a surfactant and/or a micro organic fiber insoluble in water is preferable.

As the surfactant, polystyrene sulfonate, polyoxyethylene alkyl sulfate ether, polyoxyethylene alkylene alkyl ether, polyoxyethylene distyrenated phenyl ether, polyoxyethylene tribenzyl phenyl ether, naphthalene sulfonate formalin condensate, polyoxyethylene sorbitan monolaurate, palm oil fatty acid amidopropyl betaine liquid or the like can be used.

A content of the surfactant in the collecting layer forming raw material is preferably from 0.1 to 10 parts by mass, and further preferably from 0.5 to 5 parts by mass, when a total of the ceramic raw material for the collecting layer and the pore former is 100 parts by mass. When the content is smaller than 0.1 part by mass, the fluidity of the collecting layer forming raw material lowers, and the surface of the electrolyte film is not easily coated with the collecting layer forming raw material sometimes. Even when the content is larger than 10 parts by mass, the fluidity does not enhance sometimes.

As the micro organic fiber insoluble in water, a cellulose fiber, an aramid fiber or the like can be used. Here, the micro organic fiber is a fiber which has a pillar-like structure or a needle-like structure and in which a ratio (a long diameter/a short diameter) between the long diameter (a length of the fiber (the fiber length)) and the short diameter (the largest length among lengths in a direction orthogonal to a length direction (a long diameter direction)) is 1000 or larger, and the length of the short diameter is 0.5 μm or smaller. The micro organic fiber is used as the viscosity regulator, and is preferably insoluble in water. When the viscosity of the collecting layer forming raw material is regulated by the micro organic fiber insoluble in water, the thickness of the collecting layer can be regulated.

A content of the micro organic fiber in the collecting layer forming raw material is preferably from 0.1 to 1.0 part by mass, and further preferably from 0.2 to 0.6 part by mass with respect to 100 parts by mass of the ceramic raw material for the collecting layer. When the content is smaller than 0.1 part by mass, the thickness of the collecting layer forming raw material becomes small sometimes. When the content is larger than 1.0 part by mass, the thickness of the collecting layer forming raw material becomes large sometimes.

The short diameter of the micro organic fiber is preferably from 0.01 to 0.5 μm, and further preferably from 0.01 to 0.1 μm. When the short diameter is larger than 0.5 μm, an effect of viscosity regulation is not sufficient sometimes. When the short diameter is smaller than 0.01 μm, the fiber aggregates sometimes. The short diameter of the micro organic fiber is a value measured with a scanning type electron microscope (SEM).

When both the surfactant and the micro organic fiber are contained in the collecting layer forming raw material, a total mass of the surfactant and the micro organic fiber is preferably 10 parts by mass or smaller with respect to 100 parts by mass of the ceramic raw material for the collecting layer.

A content of the water in the collecting layer forming raw material is preferably from 100 to 500 parts by volume, when a total volume of the ceramic raw material for the collecting layer and the pore former is 100 parts by volume. As to the content of the water, a suitable amount may be selected from the above range in accordance with a type of the electrolyte, ceramic raw material or pore former. When the content of the water is small, the viscosity of the collecting layer forming raw material becomes high, and the body is not easily coated with the material sometimes. When the content of the water is large, the viscosity of the collecting layer forming raw material lowers, and it becomes difficult to regulate the thickness of the collecting layer sometimes.

As a method of attaching the collecting layer forming raw material to the electrolyte layer disposed on the surface of the non-fired partition wall parent material in the remaining cells of the honeycomb formed body (the one-side plugged honeycomb formed body), a method of immersing the honeycomb filter into the slurried collecting layer forming raw material (dip coating) or a method of pouring the slurried collecting layer forming raw material into the cells of the honeycomb filter is preferable. By such a method, the surface of the electrolyte film disposed on the surface of the non-fired partition wall parent material in the cells can uniformly be coated with the collecting layer forming raw material. Moreover, the number of coating times with the collecting layer forming raw material is preferably the number of the times with which a desirable thickness is obtained. The number of the coating times with the collecting layer forming raw material may be one or a plurality of times, but one to three times are preferable.

Moreover, the collecting layer forming raw material (the non-fired collecting layer) is preferably dried after coating the surface of the electrolyte layer with the collecting layer forming raw material. A temperature during the drying is preferably from 60 to 150° C., further preferably from 80 to 120° C., and especially preferably from 80 to 100° C. When the temperature is higher than 150° C., the electrolyte film melts sometimes. When the temperature is lower than 60° C., much time is required for evaporating the water content sometimes. There are not any special restrictions on a drying time, but the raw material is preferably dried for about 0.5 to 2 hours.

A region of 30% or larger of the surface of the non-fired partition wall parent material (the electrolyte layer) in the inflow cells is preferably coated with the collecting layer forming raw material, a region of 50% or larger is further preferably coated, and a region of 100% is especially preferably coated. Consequently, in the obtained honeycomb filter, the collecting layer 13 can preferably be formed in a desirable region (30% or larger is preferable, 50% or larger is further preferable, and 100% is especially preferable) of the surface of the partition wall parent material 1 in the inflow cells 2a.

Figure 13:
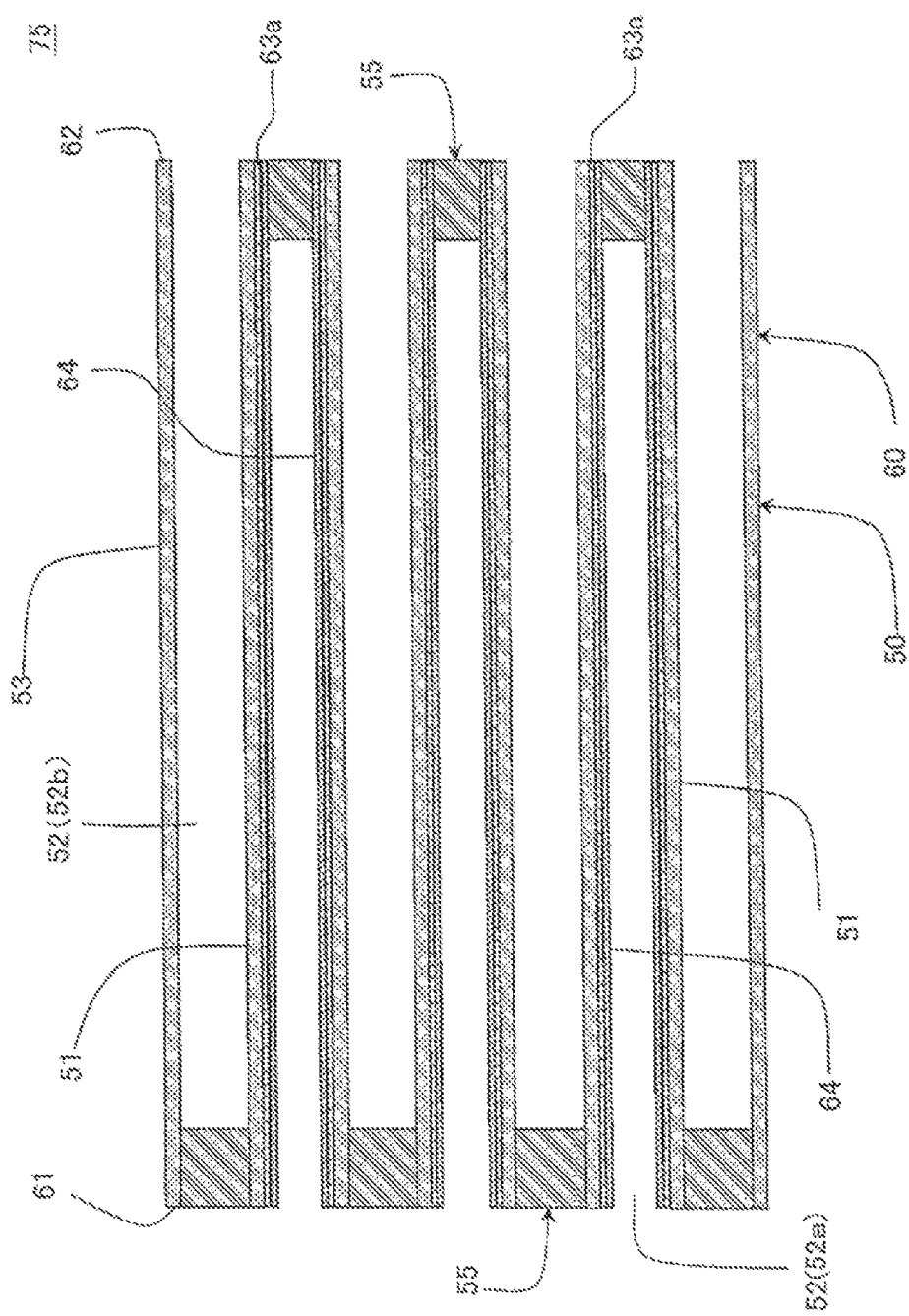
FIG. 13 is a schematic view showing a cross section of the honeycomb formed body with the non-fired collecting layer prepared in a second plugging step in the embodiment of the manufacturing method of the honeycomb filter according to the present invention.

(2-6) Second Plugging Step:

Next, as shown in FIG. 13, the plugged portions 55 are arranged in open frontal areas of the remaining cells (the inflow cells 52a) in the end surface 62 on the outflow side of the fluid in the honeycomb formed body 50 (a second plugging step). In consequence, a honeycomb formed body 75 with the non-fired collecting layer can be obtained.

In the second plugging step, the plugged portions 55 are preferably formed in the outflow-side end surface 62 of the one-side plugged honeycomb formed body 73 with the non-fired collecting layer (see FIG. 11) in the same manner as in the first plugging step.

(2-7) Firing Step:

Next, the honeycomb formed body coated with the electrolyte film and the collecting layer forming raw material (the honeycomb formed body with the non-fired collecting layer) is fired to prepare the honeycomb filter 100 of the embodiment of the honeycomb filter according to the present invention (see FIGS. 1 to 3) (the firing step). In the firing step, "the electrolyte film melts and vaporizes (part of the film is decomposed to vaporize sometimes), and the non-fired collecting layer is deformed to spread in the direction of the partition wall parent material while being fired" by heating. As shown in FIG. 2 and FIG. 3A, the collecting layer 13 is directly disposed on the partition wall parent material 1. At this time, the electrolyte layer disappears. In consequence, the collecting layer having a uniform thickness is formed on the surface of the partition wall parent material of the honeycomb filter. This is because "the non-fired collecting layer having the uniform thickness" formed on the surface of the electrolyte film is deformed to come in contact closely with the partition wall parent material (fired), whereby the obtained collecting layer also has a uniform thickness.

In the firing step, as described above, the electrolyte film is heated to disappear, and the non-fired collecting layer is fired to become the collecting layer. Moreover, the honeycomb formed body and the plugged portions are fired, to obtain the honeycomb filter including the honeycomb base material, the plugged portions and the collecting layer. It is to be noted that the honeycomb formed body (the honeycomb formed body with the non-fired collecting layer) is fired after coating the surface of the electrolyte film with the collecting layer forming raw material.

In the firing step, the honeycomb formed body (the honeycomb formed body with the non-fired collecting layer) is preferably calcinated (fired at a low temperature) prior to finally firing (firing at a high temperature) the honeycomb formed body (the honeycomb formed body with the non-fired collecting layer). The calcinating is performed for degreasing. There are not any special restrictions on a calcinating method, as long as organic matters (an organic binder, a surfactant, a pore former, etc.) contained in the honeycomb formed body with the non-fired collecting layer can be removed. In general, a burning temperature of the organic binder is from about 100 to 300° C., and a burning temperature of the pore former is from about 200 to 800° C. Therefore, calcinating conditions preferably include heating performed in an oxidation atmosphere at about 200 to 1000° C. for 3 to 100 hours. In this manner, when the calcinating is performed in the firing step, the melting and vaporization of the electrolyte film occur during the calcinating, and the non-fired collecting layer is deformed to come in contact closely with the non-fired partition wall parent material.

The final firing of the honeycomb formed body (the honeycomb formed body with the non-fired collecting layer) is performed to sinter and densify the forming raw material constituting the calcinated honeycomb formed body with the non-fired collecting layer, thereby acquiring a predetermined strength. Firing conditions (temperature, time, and atmosphere) vary in accordance with a type of the forming raw material or the like, and hence adequate conditions may be selected in accordance with the type thereof. For example, when the cordierite forming raw material is used as the forming raw material of the honeycomb formed body, the firing temperature is preferably from 1410 to 1440° C. Moreover, the firing time is preferably from 4 to 8 hours as maximum temperature keeping time. There are not any special restrictions on an apparatus which performs the calcinating and the final firing, but an electric furnace, a gas furnace or the like can be used.

EXAMPLES

Hereinafter, the honeycomb filter and the manufacturing method of the honeycomb filter of the present invention will further specifically be described with respect to examples. However, the present invention is not limited to these examples.

Example 1

As a ceramic raw material, a cordierite forming raw material (talc, kaolin and alumina) was used. A mass ratio of talc, kaolin and alumina was a mass ratio at which cordierite was obtained after firing. In 100 parts by mass of the ceramic raw material, 4 parts by mass of binder (methylcellulose) and 35 parts by mass of water were mixed to obtain a ceramic forming raw material. The obtained ceramic forming raw material was kneaded by using a kneader, to obtain a kneaded material. The obtained kneaded material was extruded by using a vacuum extrusion-forming machine, to obtain a honeycomb formed body. In the obtained honeycomb formed body, a thickness of each of partition walls was 300 μm, a cell density was 48 cells/cm$^2$, and the whole shape was a cylindrical shape (a diameter of an end surface was 40 mm, and a length in a cell extending direction was 30 mm). In a cross section orthogonal to the cell extending direction, a cell shape was a square. Moreover, an area of a cross section of each cell "which was orthogonal to the cell extending direction (a longitudinal direction)" was 1.31 mm$^2$. The obtained honeycomb formed body was dried with microwaves and hot air.

Next, part of open frontal areas of a plurality of cells in one end surface (the inflow-side end surface) of the honeycomb formed body was masked. At this time, the cells provided with the mask and the cells which were not provided with the mask were alternately arranged. Moreover, the end of the body on a masked side was immersed into a plugging slurry containing a cordierite forming raw material, to charge, with the plugging slurry, the open frontal areas of the cells which were not provided with the mask. In consequence, a one-side plugged honeycomb formed body was obtained.

Next, 134 g of a citric acid was added to 93 g of water, and stirred to obtain an aqueous citrate solution (the aqueous electrolyte solution). A content of the citric acid was 93% of the saturated solubility at 20° C.

Next, the surface of the non-fired partition wall parent material in the cells which were not provided with the plugged portions of the one-side plugged honeycomb formed body was coated with the aqueous citrate solution (the solution was attached). A coating method was as follows. An end of the one-side plugged honeycomb formed body which was provided with the plugged portions was immersed into the aqueous citrate solution, to dip-coat the honeycomb formed body with the aqueous citrate solution. At this time, the whole one-side plugged honeycomb formed body was immersed into the aqueous citrate solution so as to coat, with the aqueous citrate solution, all the partition walls in the inflow cells (the cells which were not provided with the plugged portions). It is to be noted that the only outflow-side end surface of the one-side plugged honeycomb formed body (the end surface which was not provided with the plugged portions) was prevented from coming in contact with the aqueous citrate solution. Afterward, the body was dried at 80° C. In consequence, the one-side plugged honeycomb formed body provided with the electrolyte film was obtained. It is to be noted that the number of coating operation times with the citric acid was one. A thickness of the dried electrolyte film was 10 µm.

Next, 15 g of alumina particles having a specific surface area of 7 $m^2/g$, 78 g of graphite (a pore former) having an average particle diameter of 10 µm, 2 g of polystyrene sulfonate, 134 g of citric acid and 93 g of water were mixed with a homogenizer, and a slurried collecting layer forming raw material was prepared. A content of the citric acid was 93% of a saturated solubility at 20° C. Moreover, a ratio of a total volume of the ceramic raw material for the collecting layer (the alumina particles) and the pore former (graphite) to the volume of the collecting layer forming raw material was 18 vol %.

Next, the end of "the one-side plugged honeycomb formed body which was provided with the electrolyte film" was immersed into the collecting layer forming raw material, to dip-coat "the one-side plugged honeycomb formed body with the electrolyte film" with the collecting layer forming raw material. At this time, the whole "one-side plugged honeycomb formed body provided with the electrolyte film" was immersed into the collecting layer forming raw material so that all partition walls in inflow cells were coated with the collecting layer forming raw material. It is to be noted that the only outflow-side end surface of "the one-side plugged honeycomb formed body provided with the electrolyte film" (the end surface which was not provided with the plugged portions) was prevented from coming in contact with the collecting layer forming raw material. Afterward, the body was dried at 80° C. Afterward, an operation from the above "dip-coating" to "the drying" was repeated again. That is, the number of the coating times with the collecting layer forming raw material was two. In consequence, the one-side plugged honeycomb formed body with the non-fired collecting layer was obtained. The thickness of the dried non-fired collecting layer was 30 µm.

Next, open frontal areas of cells of the other end surface (the outflow-side end surface) of the honeycomb formed body (the one-side plugged honeycomb formed body with the non-fired collecting layer) were charged with the plugging slurry in the same manner as in the method of forming the plugged portions in the one end surface (the inflow-side end surface) of the honeycomb formed body. In consequence, both the end surfaces of the obtained honeycomb filter had a state where the cell open frontal areas and the plugged portions were alternately arranged to form a checkered pattern. Afterward, the honeycomb formed body charged with the plugging slurry was dried. In consequence, the honeycomb formed body with the non-fired collecting layer was obtained.

Next, the honeycomb formed body with the non-fired collecting layer was heated at 450° C. for five hours, and degreased. Furthermore, the body was fired by heating the body at 1425° C. for seven hours, to obtain a honeycomb filter.

As to the obtained honeycomb filter, by the following methods, there were measured "a thickness of the collecting layer", "a pore surface area ratio (the collecting layer/the partition wall parent material)", "a deep layer ratio (the thickness of the deep layer/the thickness of each partition wall)", "an initial pressure loss" and "a 200 nm or smaller PM initial collecting efficiency". The results are shown in Table 1. In Table 1, "the film thickness of each corner portion of the collecting layer" is "the thickness of a portion of the collecting layer positioned in each corner portion of each cell". Moreover, "the film thickness of the center of the side of the collecting layer" is "the thickness of the portion of the collecting layer positioned in the center of the side of the cell". Furthermore, ""the corner portion"/"the center of the side"" is a value obtained by dividing "the thickness of the portion of the collecting layer positioned in the corner portion of the cell" by "the thickness of the portion of the collecting layer positioned in the center of the side of the cell". This indicates a multiple number of "the thickness of the portion of the collecting layer positioned in the corner portion of the cell" with respect to "the thickness of the portion of the collecting layer positioned in the center of the side of the cell". Moreover, "the cross section of the cell" means a cross section orthogonal to the cell extending direction. Moreover, "a solubility" of "the aqueous electrolyte solution" and "the collecting layer forming raw material" indicates a ratio when the saturated solubility is 100%. Moreover, "the pore surface area ratio (the collecting layer/the partition wall parent material)" indicates a value obtained by the pore surface area per unit volume of the collecting layer by the pore surface area per unit volume of the partition wall parent material. Furthermore, "the deep layer ratio (the thickness of the deep layer)" is a value obtained by multiplying, by 100 times, a value obtained by dividing the thickness of a portion which penetrates into pores of the partition wall parent material (the deep layer 22 (see FIG. 4)) by the thickness of each partition wall.

(Thickness of Collecting Layer)

"The thickness of "the portion positioned in the corner portion of the cell" of the collecting layer" and "the thickness of "the portion positioned in the center of the side of the cell" of the collecting layer" were obtained by the following method. First, the honeycomb filter is buried in a resin (an epoxy resin) to fill pores of partition walls of the honeycomb filter with the resin, thereby acquiring a scanning type electron microscope (SEM) image of a cross section of the honeycomb filter which is orthogonal to the cell extending direction. The SEM image is an image having a magnification of 200 times and a size of 960×1280 pixels. "The thickness of "the portion positioned in the corner portion of the cell" of the collecting layer" and "the thickness of "the portion positioned in the center of the side of the cell" of the collecting layer" are measured by using the obtained SEM image. "The thickness of "the portion positioned in the corner portion of the cell" of the collecting layer" is measured in four corner portions of each of optionally selected four cells (16 portions). Moreover, "the thickness of "the portion positioned in the center of the side of the cell" of the collecting layer" is measured in four sides of each of optionally selected four cells (16 portions). Each of "the thickness of "the portion positioned in the corner portion of the cell" of the collecting layer" and "the thickness of "the portion positioned in the center of the side of the cell" of the collecting layer" is an average value of 16 measured values.

(Pore Surface Area Ratio)

The honeycomb filter is buried in a resin (an epoxy resin) to fill pores of the partition walls of the honeycomb filter with the resin, thereby acquiring a scanning type electron microscope (SEM) image of a cross section of the honeycomb filter which is orthogonal to a cell extending direction. A partition wall in the obtained SEM image is divided by a width of 5 µm from a partition wall center (the center in a thickness direction) to a surface layer in the image (by image analysis), and each "divided part (divided region)" is subjected to the following processing ("the dividing" does not mean cutting, but means that each divided region is "distinguished" by a boundary line). A peripheral length of the surface of each partition wall and an area of each partition wall of each divided part are measured by using image analysis software (Image-Pro Plus 6.2J manufactured by Media Cybernetics Co.). "The peripheral length/the area" is the pore surface area per unit volume of the divided part. Here, "the peripheral length" is a length obtained by distinguishing a portion where the material is present and a portion (the pore) where the material is not present in each "divided part", and adding up all the lengths of boundary lines between the portions where the material is present and the pores. The pore surface area per unit volume of the divided part closest to the surface is the pore surface area per unit volume of "the collecting layer", and the pore surface area per unit volume of the divided part of the partition wall center is the pore surface area per unit volume of "the partition wall parent material". Moreover, a value obtained by dividing the obtained "pore surface area per unit volume of the collecting layer" by "the pore surface area per unit volume of the partition wall parent material" is "the pore surface area ratio". Each pore surface area is measured in the portion "positioned in the center of the side of the cell" in the partition wall. Moreover, the SEM image was acquired in a region of 3700 μm², and the region was analyzed.

(Deep Layer Ratio)

By a method similar to "a method of specifying "a boundary portion between the surface layer 21 of the collecting layer 13 and the deep layer 22 of the collecting layer 13" and "a boundary portion between a region where the deep layer 22 of the collecting layer 13 and the partition wall parent material 1 are mixed and a region where the only partition wall parent material 1 is present in the partition wall 23", there are obtained a depth D1 of "the boundary portion between the surface layer 21 of the collecting layer 13 and the deep layer 22 of the collecting layer 13", and a depth D2 of "the boundary portion between the region where the deep layer 22 of the collecting layer 13 and the partition wall parent material 1 are mixed and the region where the only partition wall parent material 1 is present" (see FIG. 4). Then, a value obtained by subtracting D1 from D2 is "the thickness of the deep layer". Moreover, a method of measuring the thickness of each of the partition walls is a method of filling the pores of the partition walls with the resin to acquire an SEM image and obtaining the thickness from the scanning type electron microscope (SEM) image in the same manner as in the method of measuring the above "pore surface area ratio". Then, the obtained "thickness of the deep layer" is divided by "the thickness of the partition wall", and multiplied by 100 times to obtain "the deep layer ratio (%)". "The thickness of the deep layer" and "the thickness of the partition wall" are measured in the portion "positioned in the center of one side of the cell" in the partition walls. Moreover, the SEM image was acquired in a region of 3700 μm², and the region was analyzed.

(Initial Pressure Loss)

A cubic of 30 mm×30 mm×30 mm ("the cube" in which an open frontal area of one end of each of cells is formed in "one surface", and an open frontal area of the other end of the cell is formed in "the other surface" parallel to the above "one surface") is cut out from "the dried honeycomb formed body" prepared on the same conditions as those of each of examples and comparative examples. Then, a honeycomb filter is prepared by using the cutout cubic in the same manner as in each of the examples and comparative examples. The obtained honeycomb filter is used as a sample for evaluation as to the honeycomb filter of each of the examples and comparative examples. The obtained sample for evaluation is attached to "a PM collecting efficiency measuring apparatus" so that "the one surface" in which the cells are open becomes "a gas inflow-side surface".

The PM collecting efficiency measuring apparatus includes a main body to which the evaluation sample is attached, a PM generating device is disposed on an upstream side of the main body, and the apparatus is configured to supply, to the main body, a PM generated by this PM generating device. The evaluation sample is attached so as to divide (partition) the interior of the main body into the upstream side and a downstream side. Moreover, in the main body, measuring holes are made in the evaluation sample on the upstream side and the downstream side. Pressures on the upstream and downstream sides of the evaluation sample can be measured through the measuring holes, respectively. Moreover, in the main body, an inlet PM measuring section is attached to the upstream side of the evaluation sample, and an outlet PM measuring section is attached to the downstream side of the evaluation sample.

When an initial pressure loss (kPa) is measured, air is supplied to the main body in a state where the PM is not generated. Specifically, the air which does not contain the PM is supplied to the main body, and passed through the evaluation sample. At this time, a flow velocity (a permeation flow velocity) when the air which does not contain the PM permeates the evaluation sample is adjusted to obtain an arbitrary point of 1 liter/minute or higher and 10 liters/minute or lower. Then, a difference between the pressure measured through the upstream-side measuring hole and the pressure measured through the downstream-side measuring hole is the initial pressure loss.

(200 nm or Smaller PM Initial Collecting Efficiency)

In the same manner as in the above measurement of "the initial pressure loss", PM-containing air permeates through the evaluation sample by use of "the PM collecting efficiency measuring apparatus". Then, an amount (an integrated value) of the PM is measured in the inlet PM measuring section and the outlet PM measuring section for 150 seconds after the PM starts to be deposited in the evaluation sample. Here, when the amount of the PM is measured in the inlet PM measuring section and the outlet PM measuring section, the only PM having particle diameters of 200 nm or smaller is a measurement object. Then, a ratio of the PM amount (the integrated value) measured in the outlet PM measuring section to the PM amount (the integrated value) measured in the inlet PM measuring section is calculated, and a value obtained by subtracting the obtained value from 1 is "the 200 nm or smaller PM initial collecting efficiency".

TABLE 1

|  |  | Example 1 | Example 2 | Example 3 | Example 4 | Example 5 | Example 6 | Example 7 | Comparative Example 1 | Comparative Example 2 |
|---|---|---|---|---|---|---|---|---|---|---|
| Honeycomb formed body | Partition wall thickness (μm) | 300 | 300 | 300 | 300 | 300 | 100 | 200 | 300 | 300 |
|  | Cell density (cells/cm2) | 48 | 48 | 48 | 48 | 48 | 96 | 32 | 48 | 48 |
|  | Sectional shape of cell | Square | Square | Square | Square | Square | Square | Square | Square | Square |
|  | Sectional area of cell (mm²) | 1.31 | 1.31 | 1.31 | 1.31 | 1.31 | 0.85 | 2.46 | 1.31 | 1.31 |

TABLE 1-continued

|  |  | Example 1 | Example 2 | Example 3 | Example 4 | Example 5 | Example 6 | Example 7 | Comparative Example 1 | Comparative Example 2 |
|---|---|---|---|---|---|---|---|---|---|---|
| Aqueous electrolyte solution | Electrolyte | Citric acid | Citric acid | Citric acid | Citric acid | Citric acid | Citric acid | Citric acid | Nil | Nil |
|  | Solubility | 93% | 93% | 93% | 93% | 93% | 50% | 93% |  |  |
|  | No. of coating times (times) | 1 | 1 | 1 | 1 | 1 | 2 | 1 |  |  |
| Collecting layer forming raw material | Ceramic raw material | Alumina | Alumina | Alumina | Alumina | Alumina | Alumina | Alumina | Alumina | Alumina |
|  | Specific surface area ($m^2/g$) | 7 | 7 | 7 | 7 | 7 | 7 | 7 | 7 | 7 |
|  | Content (g) | 15 | 15 | 15 | 15 | 15 | 15 | 15 | 15 | 15 |
|  | Pore former | Graphite | Graphite | Graphite | Graphite | Graphite | Graphite | Graphite | Graphite | Graphite |
|  | Particle dia. (μm) | 10 | 10 | 10 | 10 | 10 | 10 | 10 | 10 | 10 |
|  | Content (g) | 78 | 78 | 78 | 78 | 78 | 78 | 78 | 78 | 78 |
|  | Polystyrene sulfonate (g) | 2 | 2 | 2 | 2 | 2 | 2 | 2 | 2 | 2 |
|  | Citric acid (g) | 134 | 134 | 134 | 134 | 134 | 166 | 117 | 134 | 134 |
|  | Water (g) | 93 | 93 | 93 | 93 | 93 | 115 | 82 | 93 | 93 |
|  | Solubility | 93% | 93% | 93% | 93% | 93% | 93% | 93% | 93% | 93% |
|  | Volume % | 18% | 18% | 18% | 18% | 18% | 15% | 20% | 18% | 18% |
|  | No. of coating times (times) | 2 | 1 | 3 | 2 | 2 | 2 | 2 | 2 | 1 |
| Film thickness of center of side of collecting layer |  | 18 μm | 10 μm | 26 μm | 5 μm | 38 μm | 21 μm | 11 μm | 10 μm | 5 μm |
| Film thickness of corner portion of collecting layer |  | 29 μm | 14 μm | 75 μm | 10 μm | 75 μm | 39 μm | 25 μm | 67 μm | 22 μm |
| "Corner portion"/"center of side" (times) |  | 1.6 | 1.4 | 2.9 | 2.0 | 2.0 | 1.9 | 2.3 | 6.4 | 4.4 |
| Material of partition wall parent material |  | Cordierite | Cordierite | Cordierite | Cordierite | Cordierite | Cordierite | Cordierite | Cordierite | Cordierite |
| Material of collecting layer |  | Alumina | Alumina | Alumina | Alumina | Alumina | Alumina | Alumina | Alumina | Alumina |
| Pore surface area ratio (collecting layer/partition wall parent material) |  | 21.5 | 20.6 | 21.6 | 19.9 | 21.6 | 21.5 | 21.1 | 20.5 | 19.6 |
| Thickness of penetrating portion of collecting layer/thickness of partition wall |  | 0.6% | 0.6% | 0.6% | 0.7% | 0.6% | 1.7% | 0.9% | 1.6% | 1.6% |
| Initial pressure loss (kPa) |  | 0.721 | 0.704 | 0.741 | 0.695 | 0.776 | 0.757 | 0.350 | 0.718 | 0.698 |
| 200 nm or smaller PM initial collecting efficiency |  | 89% | 85% | 91% | 75% | 92% | 88% | 85% | 80% | 70% |

Examples 2 to 7 and Comparative Examples 1 and 2

Honeycomb filters were prepared in the same manner as in Example 1 except that conditions were changed as shown in Table 1. Then, evaluations were performed in the same manner as in Example 1. The results are shown in Table 1.

It is seen from Table 1 that in the honeycomb filters of Examples 1 to 7, a value of ""the corner portion"/"the center of the side"" is from 1.4 to 2.9, and hence both results of an initial pressure loss and "a 200 nm or smaller PM initial collecting efficiency" are excellent. In consequence, it is seen that when "the thickness of "the portion positioned in the corner portion of the cell" of the collecting layer" is from one to three times "the thickness "the portion positioned in the center of the side of the cell" of the collecting layer", both the results of the initial pressure loss and "the 200 nm or smaller PM initial collecting efficiency" are excellent.

Moreover, when the honeycomb filter of Example 1 is compared with the honeycomb filter of Comparative Example 1, the values of the initial pressure losses are almost the same. On the other hand, the honeycomb filter of Example 1 indicates a higher value of "the 200 nm or smaller PM initial collecting efficiency". Moreover, also when the honeycomb filter of Example 2 or Example 4 is compared with the honeycomb filter of Comparative Example 2, the values of the initial pressure losses are almost the same. However, the honeycomb filter of Example 2 or 4 indicates a higher value of "the 200 nm or smaller PM initial collecting efficiency". Moreover, in the honeycomb filter of Example 5, "the film thickness of the center of the side of the collecting layer" is as large as 38 μm, and hence it is seen that "the initial pressure loss" becomes relatively large as compared with the other examples. Furthermore, in the honeycomb filter of Example 4, "the film thickness of the center of the side of the collecting layer" is as small as 5 μm, and hence it is seen that "the 200 nm or smaller PM initial collecting efficiency" becomes relatively small as compared with the other examples.

A honeycomb filter of the present invention can suitably be utilized as a filter to purify gases discharged from an internal combustion engine such as a diesel engine, various types of combustion apparatuses and the like. Moreover, a manufacturing method of a honeycomb filter of the present invention can suitably be utilized in manufacturing such a honeycomb filter.

DESCRIPTION OF REFERENCE SIGNS

1: partition wall parent material, 2: cell, 2a: inflow cell, 2b: outflow cell, 3: outer peripheral wall, 4: honeycomb base material, 5: plugged portion, 11: inflow-side end surface, 12: outflow-side end surface, 13: collecting layer, 21: surface layer, 22: deep layer, 23: partition wall, 50: honeycomb formed body, 51: non-fired partition wall parent material, 52: cell, 52a: inflow cell, 52b: outflow cell, 53: outer peripheral wall, 55: plugged portion, 60: one-side plugged honeycomb formed body, 61: inflow-side end surface, 62: outflow-side end surface, 63: aqueous electrolyte solution film, 63a: electrolyte film, 64: non-fired collecting layer, 70: one-side plugged honeycomb formed body with aqueous electrolyte solution film, 73: one-side plugged honeycomb formed body with non-fired collecting layer, 75: honeycomb formed body with non-fired collecting layer, 100: honeycomb filter, α, β and γ: straight line, C: center, D1 and D2: depth, and Y: side (one side).

What is claimed is:

1. A honeycomb filter comprising: a honeycomb base material including a porous partition wall parent material to partition and form a plurality of cells which become through channels of a fluid and which extend from one end surface to the other end surface; plugged portions arranged in open frontal areas of predetermined cells in an end surface on an inflow side of the fluid which is the one end surface, and open frontal areas of the remaining cells in an end surface on an outflow side of the fluid which is the other end surface; and a porous collecting layer disposed on the surface of the partition wall parent material in the remaining cells, wherein in a cross section orthogonal to an extending direction of the cells, a shape of the cells is a rectangular shape, and a thickness of a portion of the collecting layer which is positioned in each of corner portions of each of the cells is from more than one to less than three times that of a portion of the collecting layer which is positioned in the center of each of sides of the cell.

2. The honeycomb filter according to claim 1, wherein in the cross section orthogonal to the extending direction of the cells, the portion of the collecting layer which is positioned in the center of the side of the cell is from 10 to 30 μm.

3. The honeycomb filter according to claim 1, wherein in the cross section orthogonal to the extending direction of the cells, an area of the cells is from 0.8 to 3.0 mm$^2$.

4. The honeycomb filter according to claim 2, wherein in the cross section orthogonal to the extending direction of the cells, an area of the cells is from 0.8 to 3.0 mm$^2$.

5. The honeycomb filter according to claim 1, wherein a material of the partition wall parent material is cordierite, and a material of the collecting layer includes at least one selected from the group consisting of alumina, mullite and spinel.

6. The honeycomb filter according to claim 2, wherein a material of the partition wall parent material is cordierite, and a material of the collecting layer includes at least one selected from the group consisting of alumina, mullite and spinel.

7. The honeycomb filter according to claim 3, wherein a material of the partition wall parent material is cordierite, and a material of the collecting layer includes at least one selected from the group consisting of alumina, mullite and spinel.

8. The honeycomb filter according to claim 4, wherein a material of the partition wall parent material is cordierite, and a material of the collecting layer includes at least one selected from the group consisting of alumina, mullite and spinel.

* * * * *